US007417659B2

(12) United States Patent
Yamamura

(10) Patent No.: US 7,417,659 B2
(45) Date of Patent: Aug. 26, 2008

(54) EXPOSURE DEVICE, LED PRINT HEAD, AND IMAGE FORMING APPARATUS HAVING THE EXPOSURE DEVICE AND THE LED PRINT HEAD

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 100 days.

(21) Appl. No.: 11/166,079

(22) Filed: Jun. 27, 2005

(65) Prior Publication Data
US 2006/0001733 A1    Jan. 5, 2006

(30) Foreign Application Priority Data
Jun. 30, 2004  (JP) .............................. 2004-192807

(51) Int. Cl.
B41J 2/47    (2006.01)
B41J 2/435   (2006.01)
(52) U.S. Cl. ...................................... 347/241; 347/236
(58) Field of Classification Search ................. 347/236, 347/244, 241, 238; 359/625, 620; 396/344
See application file for complete search history.

(56) References Cited

U.S. PATENT DOCUMENTS

| 4,897,672 A | * | 1/1990 | Horiuchi et al. ............. 347/236 |
| 5,363,240 A | * | 11/1994 | Miyashita ..................... 359/625 |
| 5,745,152 A | * | 4/1998 | Vincent et al. ............... 347/238 |
| 5,896,162 A | * | 4/1999 | Taniguchi ..................... 347/244 |
| 6,563,647 B2 | * | 5/2003 | Fukuzawa ..................... 359/620 |
| 6,891,558 B2 | * | 5/2005 | Ogi et al. ...................... 347/244 |

FOREIGN PATENT DOCUMENTS

| JP | 07072308 | * | 3/1995 |
| JP | 7-242018 |   | 9/1995 |
| JP | 20011255230 | * | 9/2001 |

OTHER PUBLICATIONS

Katakura et al: "Simulation of Electrophotographic Process," Oki Technical Review, Aug. 1998, vol. 64, pp. 89-92.*

* cited by examiner

Primary Examiner—Stephen D. Meier
Assistant Examiner—Carlos A Martinez, Jr.
(74) Attorney, Agent, or Firm—Rabin & Berdo, PC

(57) ABSTRACT

A shape or position of a shielding member is set corresponding to an image focusing property of each rod lens element to prevent an MTF from deteriorating, to provide a clear exposure image, and to prevent a defective image such as having a vertical streak or the like, from occurring on a printed image. To achieve the above, an exposure device used for an image forming apparatus of an electrophotographic type, comprises a lens array having a plurality of lens elements for condensing light from a light source onto a photosensitive drum; and a shielding member for shielding at least one portion of a peripheral portion with respect to a direction of an optical axis of each lens element from the light radiated from the light source, wherein the shielding member has a shape or a position set depending on an image focusing property with each lens element.

22 Claims, 13 Drawing Sheets

(a)

(b)

(c)

(a)

(b)

(a)

(b)

EXPOSURE DEVICE, LED PRINT HEAD, AND IMAGE FORMING APPARATUS HAVING THE EXPOSURE DEVICE AND THE LED PRINT HEAD

BACKGROUND OF THE INVENTION

1. Field of the Invention

This invention relates to an exposure device, an LED print head, and an image forming apparatus having the exposure device and the LED print head.

2. Description of Related Art

Conventionally, to form an exposure image with an image forming apparatus such as, e.g., a printer, a facsimile machine, a photocopier, or the like, of an electrophotographic type, during an exposure process for forming an electrostatic latent image on a photosensitive drum based on an image data, an LED (Light Emitting Diode) array of arrayed LED elements in a plurality number is used as a light source and an optical image from a light emitting point of the LED array is focused on the photosensitive drum in using a lens. A lens array is used as the lens in many cases, in which a plurality of lens elements are arranged in parallel rows (see, e.g., Japanese Patent Application Publication No. JA-H7-242,018).

In the meantime, a lens array is used in the exposure device, in which a rod lens having a refraction index distribution in a direction perpendicular to an optical axis of the lens element, i.e., in a radial direction with respect to a center of the lens, is used as the lens element.

To structure the lens array, lens elements in a cylindrical shape, having an external diameter of 0.1 to a few millimeters, are arranged in one or multiple lines in a linear manner, thereby being securely immobilized with, e.g., a resin or the like, serving as a filling material for filling up gaps among the lens elements.

On the exposure device with use of the lens array, luminosity at the time of exposure on a surface of the photosensitive drum depends on an aperture angle of the lens element composed of the rod lens, and the luminosity becomes higher as the aperture angle becomes larger. The aperture angle of the lens element in current use is set to between ten and thirty degrees, and the aperture angle of the lens element composing the lens array is desirably set to as large as possible especially in a case of the image forming apparatus in using, as the light source, the LED array with use of the LED elements having lower light intensity compared with, e.g., a semiconductor laser or the like. The aperture angle of the lens element composed of the rod lens composing the lens array currently used for the exposure device of the image forming apparatus is set to approximately twenty degrees.

Where using the lens element having the large aperture angle, however, a comatic aberration causes, which is resulted from the high refractive index at a position distant from a center of the lens element. That is, a distance between a position at which a light transmitted through a position distance from the optical axis of the lens element having the large aperture angle is focused into and a lens surface, is shorter compared with a focal distance, i.e., a distance between a position at which a light transmitted through the vicinity of a center in the lens element is focused into an image and a lens surface.

Therefore, with the lens array with use of the lens elements having the large aperture angle, a focused image defocuses due to the comatic aberration, thereby causing such a defocusing that the exposure image of the light emitting point of the LED element serving as the light source is not focused on the photosensitive drum, so that the light intensity becomes uneven at each point of the exposure image or a contrast deteriorates at the exposure images. Furthermore, on a printing with use of the image forming apparatus, the defocusing due to the comatic aberration causes irregularity in concentration or deterioration in a dot reproducibility such as resulting in unclear printed images.

The defocusing due to the comatic aberration is described next.

FIG. 2 is a view illustrating the defocusing due to the conventional comatic aberration.

FIG. 2 shows a relation between the lens element composed of the rod lens and an image-focused surface on which the light transmitted through the lens element is focused. A light source point, not shown, is to be positioned at the opposite side across the lens element from the image-focused surface. Herein, marks $O_1$, $O_2$, and $O_3$ express respectively the lights transmitted from the light source point, in which the mark $O_2$ expresses the light transmitted through a portion more distant from an optical axis of the lens element compared with the mark $O_1$ while the mark $O_3$ expresses the light transmitted through a portion even more distant from the optical axis of the lens element. On the image-focused surface, points on which these lights are focused are respectively set to marks $P_1$, $P_2$, and $P_3$. Shifts among these points on which the lights are focused is defined as the comatic aberration as well as a cause for the defocusing of the exposure image on the image-focused surface. On the condition that distances respectively between these points on the image-focused surface, on which the lights are focused, and a central point of the lens on the lens surface are respectively set to $f_1$, $f_2$, and $f_3$, inequality, $f_1 < f_2 < f_3$, is set.

Herein, with the lens array in using the lens elements having the large aperture angle, to improve the deterioration of the contrast at the exposure image due to the defocusing of the focused image resulted from the comatic aberration, it has been carried out to arrange a diaphragm on the exposure device of the image forming apparatus, in which the diaphragm shields against the light incident on or exiting from the portion distant from the central point of each lens element composing the lens array. That is, a depth of field becomes deeper to solve the defocusing, upon shielding against the lights $O_2$, $O_3$ transmitted through the position comparatively distant from the center of the lens element in FIG. 2.

Furthermore, not only the solution of the defective image and the improvement in image quality, but also further improvement in resolution is expected based on the current situation that the resolution has been improved lately on the general image forming apparatus including that of electrophotographic type. As a method for solving deterioration in the exposure image with the lens array, it has been conventionally considered as effective to arrange a shielding member to the lens array.

However, on the lens array used for the exposure device, such as described above, deviation occurs undesirably in each of the arrayed lens elements composed of the rod lens. In this case, the deviation in the arrayed lens elements is resulted from, for example, misalignment in a direction of the array of the lens elements or in a direction perpendicular to the direction of the array of the lens elements as well as in a direction perpendicular to a direction of the optical axis of each lens element, or resulted from slant due to tilting with respect to the original direction of the optical axis.

For example, the misalignment of each lens elements in the lens array used for the exposure device of the electrophotographic image forming apparatus, in the array direction, is approximately within a few percent where indicated with a value with respect to a design value. Furthermore, the extent of deviation in this misalignment is different depending on each position of the lens array, such as, e.g., an end portion, a central portion, or the like.

Herein, one example of a structure and a fabrication method of the lens array are described in reference to a drawing.

FIG. 3 is a partially cutout perspective view showing the conventional lens array.

To structure the lens array, lens elements 201 composed of the rod lens having the refractive index distribution are arranged in one or multiple rows to one backing plate 202, and subsequently synthetic resins serving as a filling material 203 is poured into gaps among the lens element 201, and further the lens elements 201 are securely immobilized upon pressed with the other backing plate 202. At that time, in a case of the backing plate 202 in a flat plate form, an array pitch of the lens elements 201 is equal to a diameter of the lens element 201, while in a case where concaves and convexes with prescribed intervals are formed onto the backing plate 202 serving as a frame plate, a pitch between the concave and the convex is set to the array pitch of the lens element 201.

These misalignment in the array or the slant of the lens element 201 is presumably caused by, e.g., deviation in the diameter of the lens element 201, twisting or bending of the lens element 201, bending or winding of the backing plate 202, deviation in the position or the shape of the concave and the convex formed on the backing plate 202, for determining the interval between the arrayed lens elements 201, deviation in fabrication at the time of securely immobilizing the lens elements 201, deviation in characteristic such as, e.g., viscosity etc., of the synthetic resin to be filled, deviation in the amount of the filled synthetic resins, or the like.

Furthermore, deviation occurs in the shape, such as due to twisting, bending, or the like, on the entire lens array.

With a molding process, an art widely known in general as a method for manufacturing the shielding member, where openings in a large number are formed to a width of the paper corresponding to a width of the image forming apparatus, with a positional accuracy of approximately 0.1 to a few millimeters corresponding to the array of the lens elements in the lens array, the opening of the shielding member has a positional accuracy of approximately several dozen percent, and even in a case with an etching process with use of a photomask or a pattern formation of a shielding pattern, the positional accuracy is set to approximately a few percent. Even where the openings are formed with a cutting process or a punching process, the positional accuracy is set to approximately several dozen percent. Furthermore, with these processing methods, since accumulated error occurs even where the positional accuracy of each opening of the shielding member is limited to a few percent, each opening undesirably gets out of position with respect to the primary intervals among the arrayed lens elements, determined with the design value.

However, with the conventional exposure device described above, where a center position of the opening on the shielding member is displaced relative to a center position of each lens element composed of the rod lens in the lens array, the light from not only a peripheral portion but also the vicinity of a center of the each lens element are cut off, so that such an effect undesirably reduces by half, as resulted from setting of the shielding member for improving an MTF (Modulation Transfer Function) of the exposure device. Furthermore, where the center position of the opening on the shielding member is displaced widely relative to the center position of each lens element in the lens array, the vicinity of the center of the lens element is shielded periodically to decrease the exposure amount in large, thereby causing problems such that white streaks appear periodically, or that the exposure image is not formed at all on the photosensitive drum so the image formation itself as to become unimplementable.

Furthermore, since the slant lens element leads to deterioration in the MTF of the exposure image with the lens element near the slant lens element, the exposure image becomes unclear, thereby causing the defective image such as having vertical streaks or the like, on the printed image.

With the exposure device generally used for the electrophotgraphic image forming apparatus, the defective image such as having the vertical streaks or the like due to deviation in the light intensity among the plural light sources, is to be improved upon correction of the light intensity of each light emitting point in the LED array for forming the exposure image. However, since the defective image such as having the vertical streaks or the like due to the slant lens elements is resulted from deterioration in the MTF of the exposure image near the slant lens element, such a defective image cannot be improved only upon the correction of the light intensity of each light emitting point in the LED array.

The deterioration in the MTF due to the slant lens elements composed of the rod lens will be described next.

FIG. 4 is a view showing a typical relation between the light emitting point and distribution of the light intensity at the exposure image with each lens element in the conventional lens array.

Herein, the light intensity at the time that two light emitting points are arranged as a light emitting point, with a minute interval, is considered. With the exposure device with use of the lens array, the exposure image from the light emitting point results in the exposure images respectively overlapped with lens elements composed of the rod lens or in the exposure image formed on the image-focused surface. On placing the light emitting points and the lens as shown in FIG. 4 (*a*), on the basis that the origin is set to a position of the exposure image from the light emitting point in a case where the lens elements in the lens array are not slanted, a direction parallel to the optical axis of each lens element, to which the light emitting point extend from the origin, is set to alphabet z, while the array direction of the lens elements is set to alphabet x. Where there exists a defectively slant lens element, such as shown in FIG. 4 (*a*), a position at which the exposure image from the light emitting point is formed with the defectively slant lens element is displaced relative to the primary place at which the exposure image is to be formed. Therefore, the distribution of the light intensity near the origin of the exposure image from the light emitting point in a case with the defectively slant lens element, is such as shown in FIG. 4 (*d*) and FIG. 4 (*e*), in which the light intensity decreases while the MTF of the exposure image deteriorates. Furthermore, as shown in FIG. 4 (*f*), since added with the exposure image from the light emitting point with the defectively slant lens element, the distribution of the light intensity changes at the exposure image as actually formed, defined as the exposure images overlapped respectively with the lens elements, compared with the primary distribution of the light intensity of the light emitting point, and therefore the MTF deteriorates.

This invention is aimed to solve the aforementioned conventional problems of the conventional exposure device and to provide an exposure device, an LED print head, and an image forming apparatus having the exposure device and the LED print head, in which the shape or position of a shielding member is set corresponding to an image focusing property of each lens element so as to prevent an MTF from deteriorating, to provide a clear exposure image, and to prevent a defective image such as having a vertical streak or the like, from occurring on a printed image.

SUMMARY OF THE INVENTION

To achieve the above, according to this invention, an exposure device used for an image forming apparatus of an electrophotographic type, comprises a lens array having a plurality of lens elements for condensing light from a light source onto a photosensitive drum; and a shielding member for shielding at least one portion of a peripheral portion with respect to a direction of an optical axis of each lens element against the light from the light source, wherein the shielding member is set in a shape or a position depending on an image focusing property of each lens element.

According to this invention, the exposure device used for the image forming apparatus of the electrophotographic type, comprises the lens array having the plurality of lens elements for condensing the light from the light source onto the photosensitive drum; and the shielding member for shielding at least one portion of the peripheral portion with respect to a direction of the optical axis of each lens element against the light from the light source, wherein the shielding member is set in a shape or a position depending on the image focusing property of each lens element.

In that case, an MTF does not deteriorate and an exposure image is clear, so that the defective image such as having a vertical streak or the like does not occur on a printed image.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein.

DETAILED DESCRIPTION OF PREFERRED EMBODIMENTS OF THE INVENTION

Hereinafter, embodiments of this invention will be described in reference to drawings.

Figure 5:
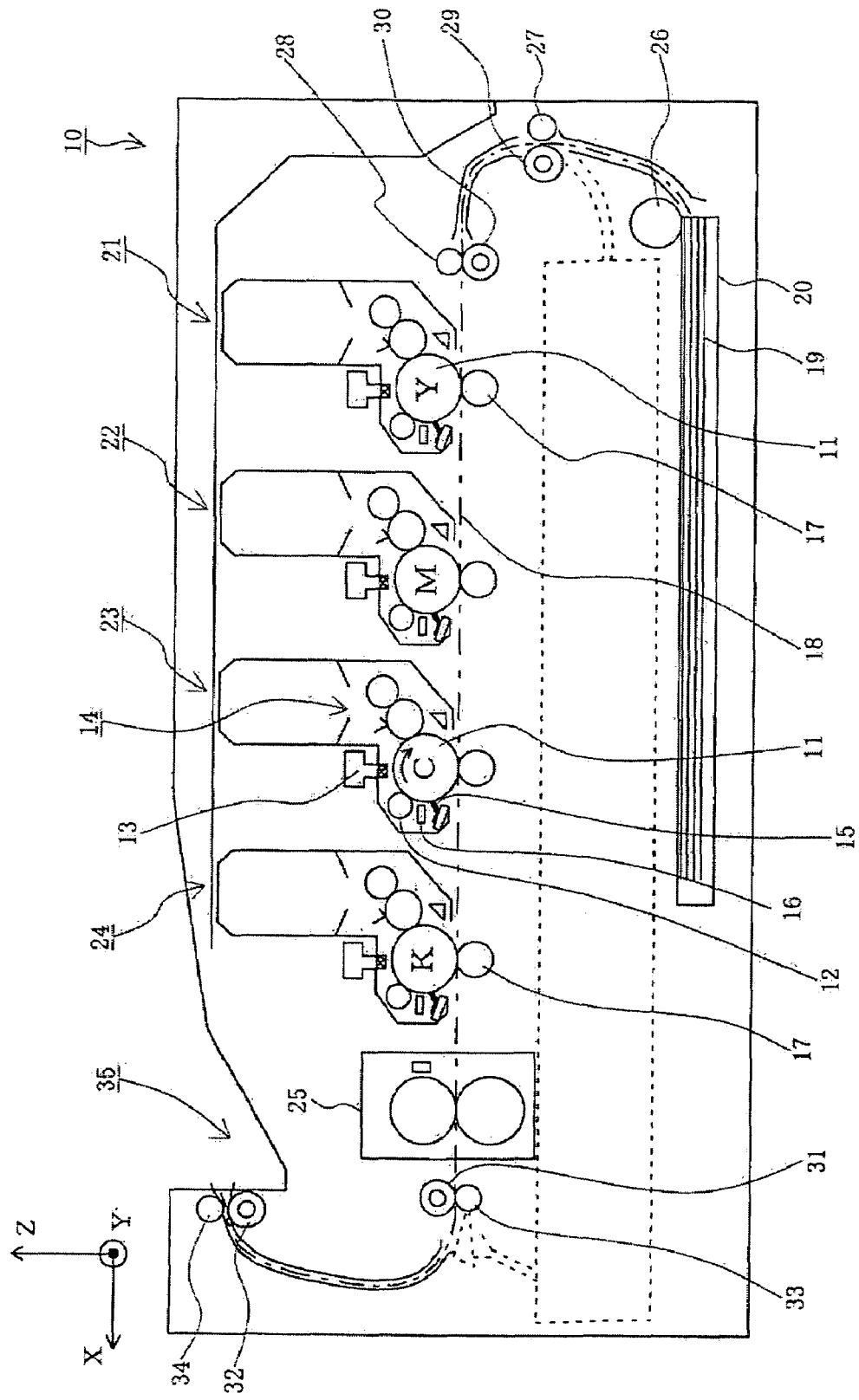
FIG. 5 is a view showing a structure of an image forming apparatus according to the first embodiment of this invention.
Figure 6:
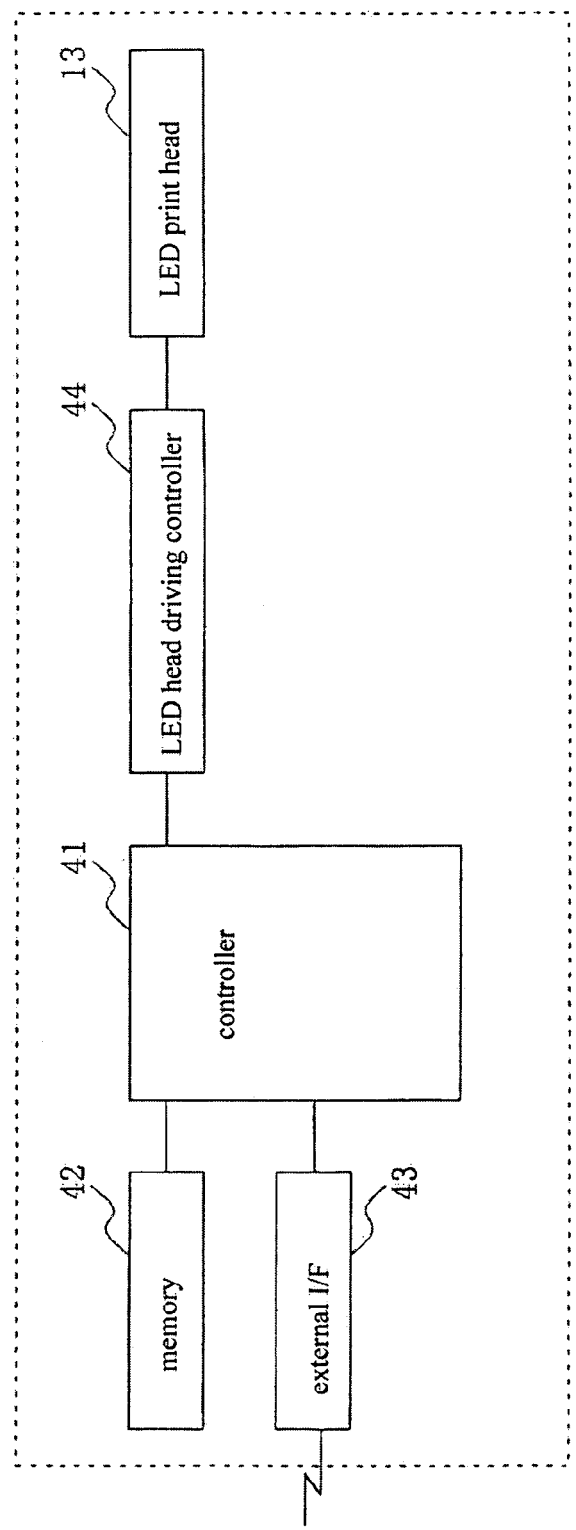
FIG. 6 is a block diagram showing a control unit of the image forming apparatus according to the first embodiment of this invention.

FIG. 5 is a view showing a structure of an image forming apparatus according to the first embodiment of this invention, and FIG. 6 is a block diagram showing a control unit of the image forming apparatus according to the first embodiment of this invention.

In FIG. 5, numeral 10 is an image forming apparatus such as, e.g., a printer, a facsimile machine, a copy machine, or a complex machine having combined functions of the printer, the facsimile machine, and the copy machine of an electrophotographic type, but the image forming apparatus 10 may be of any types such as forming an image in monochrome or multiple colors, for example.

The image forming apparatus 10 is mounted with a feeding cassette 20, in which a paper 19 defined as a medium placed to the feeding cassette 20 is conveyed with a feeding roller 26 and subsequently conveyed with a pair of rollers 27, 29 and a pair of rollers 28, 30 up to an image forming unit.

Since defined an electrophotographic color printer, the image forming apparatus 10 is arranged inside with four process cartridges 21, 22, 23, 24 respectively forming images in each of colors of yellow, magenta, cyan, and black, as an image forming unit, in tandem along with a conveyance route of the paper 19. Each of the process cartridges 21, 22, 23, 24, is arranged with a photosensitive drum 11 in a drum shape, serving as an image carrier, a charging roller 12 arranged around the photosensitive drum 11, for charging the photosensitive drum 11 upon supplying electricity to a surface thereof, and an LED print head 13 serving as an exposure device for forming an electrostatic latent image upon selectively exposing the charged surface of the photosensitive drum 11.

Furthermore, each of the process cartridges 21, 22, 23, 24, is arranged with a developing roller 14 for conveying the toner defined as a developer to the surface of the photosensitive drum 11 at which the electrostatic latent image is formed, a cleaning blade 15 for cleaning the toner remaining on the surface of the photosensitive drum 11, and a charge removing unit 16 arranged as facing the photosensitive drum 11, for removing charge remaining on the surface of the photosensitive drum 11. Furthermore, each of the process cartridges 21, 22, 23, 24 is arranged with a transfer belt 18 serving as a conveyance means for conveying the paper 19, and a transfer roller 17 for transferring a toner image to the paper 19 conveyed with the transfer belt 18.

With each of the process cartridges 21, 22, 23, 24, the charging roller 12 makes a charging process for storing the charge on the photosensitive dram 11, and the LED print head 13 makes an exposure process for exposing a position to be formed with the image data on the photosensitive drum 11 to the light, and the developing roller 14 makes a development process for attaching the toner to the exposed position, and the transfer roller 17 makes a transfer process for transferring the toner developed with the transfer roller 17 to the paper 19. It is to be noted that a fusing device 25 serving as a fusing unit makes a fusing process for fusing the toner image on the paper 19 with heat as well as pressure. Furthermore, the image forming apparatus 10 has a discharging unit 35 for discharging the paper 19 formed with the image, conveyed with a pair of discharging roller 31, 33, and a pair of discharging rollers 32, 34, to an exterior of the image forming apparatus 10.

Herein, the image forming apparatus 10 has, as shown in FIG. 6, a control unit comprising a controller 41, a memory 42, an external interface 43, an LED head driving controller 44, and an LED print head 13. The memory 42 is stored with correction data for determining a driving period for each LED element of the LED print head 13. The external interface 43 is connected to, e.g., a network or the like, not shown, to communicate with an external device, to received printing data from a host apparatus, and subsequently to transmit the printing data to the controller 41, thereby being able to make a printing. Furthermore, the controller 41 controls entire operation of the image forming apparatus 10. According to the controller 41, the LED head driving controller 44 drives the LED print head 13 based on the correction data stored in the memory 42.

Operation of the image forming apparatus 10 is described next.

The paper 19 contained in the feeding cassette 20 is first conveyed with the feeding roller 26, thereby being conveyed up to the image forming unit with the pair of rollers 27, 29, and the pair of rollers 28, 30. Inside each of the process cartridges 21, 22, 23, 24, the surface of the rotating photosensitive drum 11 is charged with the charging roller 12 to be exposed with the LED print head 13, and subsequently the electrostatic latent image is written into the charged and exposed surface of the photosensitive drum 11 to be developed in using the toner with the developing roller 14 into the toner image.

At that time, the toner image is transferred onto the paper 19 when the paper 19 conveyed in timing with the above operation is moved through the conveyance route between the photosensitive drum 11 and the transfer roller 17. The toner image in each color is transferred in piles, so that the multicolored toner image is formed on the paper 19.

The toner image on the paper 19 is fused on the paper 19 with the fusing device 25, and the paper 19 is then conveyed with the pair of discharging rollers 31, 33, and the pair of discharging rollers 32, 34, thereby being discharged with the discharging unit 35.

A structure of the LED print head 13 according to this embodiment is described next.

Figure 7:
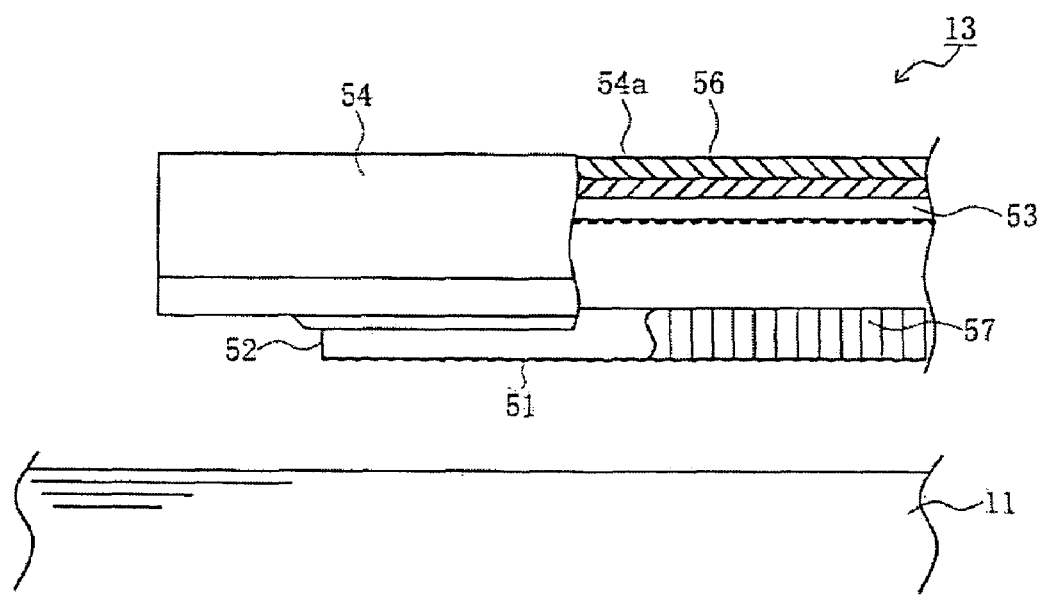
FIG. 7 is a view showing a structure of an LED print head used for the image forming apparatus according to the first embodiment of this invention.
Figure 8:
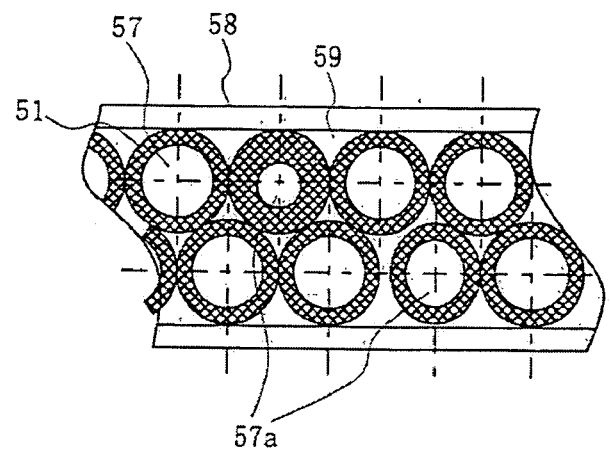
FIG. 8 is a view showing a structure of a shielding pattern of a shielding member according to the first embodiment of this invention.
Figure 8:
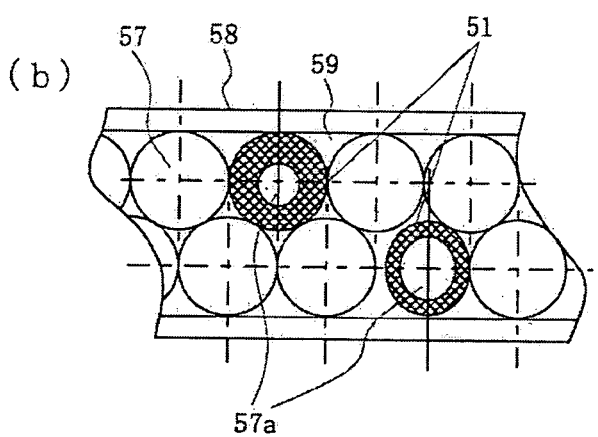
Figure 8:
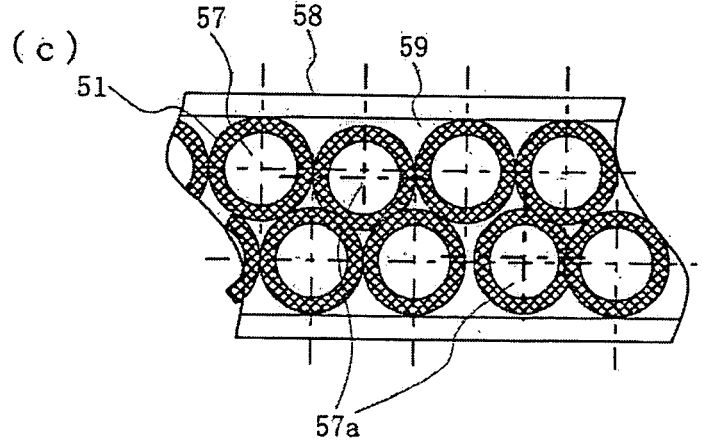

FIG. 7 is a view showing a structure of the LED print head used for the image forming apparatus according to the first embodiment of this invention, and FIG. 8 is a view showing a structure of a shielding pattern of a shielding member according to the first embodiment of this invention.

As shown in FIG. 7, the print head 13 serving as the exposure device has an LED array 53 serving as a light source and a lens array 52. Herein, the LED array 53 is arranged to an under surface of a board 56 supported with a top board 54a of a lens holder 54 while having the plurality of arrayed LED elements. It is to be noted that the board 56 is arranged with a driver IC also, for controlling emitting of the LED element.

The lens array 52 has the plurality of lens elements 56 and a shielding member 51 while being equipped to the lens holder 54 below the LED array 53. The shielding member 51 is defined as a shielding pattern with use of, e.g., a black coating material or the like for shielding against the light from the light source. It is to be noted that the lens array 52 has, as shown in FIG. 8, the plurality of lens elements 57, a filling material 59 for filling up gaps among the lens elements, and a backing plate 58 for securely immobilizing the lens elements 57.

A structure of the shielding pattern of the shielding member 51 is described next.

In this embodiment, the shielding pattern of the shielding member 51 is formed in a manner to shield one portion of the peripheral portion of the lens element 57 against the light from the LED element on the LED array 53. In this case, as shown in FIG. 8 (a), with respect to the lens element 57 in a comparatively good slant condition, the shielding pattern having an opening with a diameter in the same size as the lens element 57 is formed, while the shielding pattern having the opening with a diameter in a small size is formed with respect to the defectively slant lens element 57a such as slanted greatly in comparison. With respect to the defectively slant lens element 57a, the opening diameter of the shielding pattern is set to smaller as a value of the slant is greater. That is, as the amount of positional shift is greater at the an image-focused portion with the lens element 57, the opening portion transmitting the light from the lens element 57 is to be set smaller.

Furthermore, as shown in FIG. 8 (b), the shielding pattern may be formed only to the defective lens element 57a comparatively slanted widely. Furthermore, the opening diameter of the shielding pattern may be set smaller as a value of the slant is greater. In a case of comparatively low resolution of the image forming apparatus 10, the shielding pattern even formed in the above described manner can exert a sufficient effect.

As shown in FIG. 8(c), furthermore, the shielding pattern having the openings of the same diameter may be formed. In this case, the position of the shielding pattern is fit in the position of the lens element 57 so that the peripheral portion of the lens element 57 is shielded accurately. Where the lens element 57 in the lens array 52 is comparatively not slanted so much, the shielding pattern formed in the above described manner can exert a sufficient effect.

In this embodiment, as shown in FIG. 7, the shielding member 51 is arranged to the opening surface of the lens array 52, at a side of the photosensitive drum 11, however, the location to be arranged with the shielding member 51 is not limited to the opening surface of the lens array 52, at the side of the photosensitive drum 11 but may be set to the opening surface of the lens array 52, at a side of the LED array 53.

As shown in FIG. 8, the lens array 52 is directly painted with use of the black coating material to structure the shielding member 51 according to this embodiment, however, the shielding member 51 is not limited to the above described structure but may be formed upon forming the shielding pattern to a transmitting member for transmitting the light from the light source or upon forming the opening by digging holes on a plate member shielding against the light from the light source with an etching process or a molding method.

Furthermore, the shielding pattern of the shielding member 51 according to this embodiment is, as shown in FIG. 8, a pattern in a circular shape, for shielding the peripheral portion of each lens element 57, however, the shielding pattern is not limited to a circular shape, and the same effect can be obtained with the shielding pattern in an elliptical shape, a rectangular shape, or the like. Furthermore, the same effect can be obtained even where the defectively slant lens element 57a is entirely shielded.

The exposure device according to this embodiment, as shown in FIG. 7, is such as using the LED array 53 as the light source, in which the plurality of lens elements are arranged in parallel rows, however the exposure device is not limited to the above structure but may be such with use of a shatter composed of liquid crystal elements in combination with an exposure source such as, e.g., a semiconductor laser, a fluorescent light, a halogen lamp, or the like, used in general as the exposure device of the image forming apparatus 10.

Furthermore, the lens element 57 in the lens array 52 according to this embodiment is, as shown in FIG. 7 and FIG. 8, in a cylindrical shape as well as defined as a rod lens having a refractive index distribution extending from a central axis in a radius direction, however, the lens element 57 is not limited to the above but may have a cross section in an elliptical shape or in a rectangular shape. Furthermore, the plurality of lens arrays 52 arranged as facing one another, in which a plurality of spherical lenses or aspherical lenses are arranged in parallel rows, can be used.

A method for manufacturing the shielding member 51 is described next.

Figure 1:
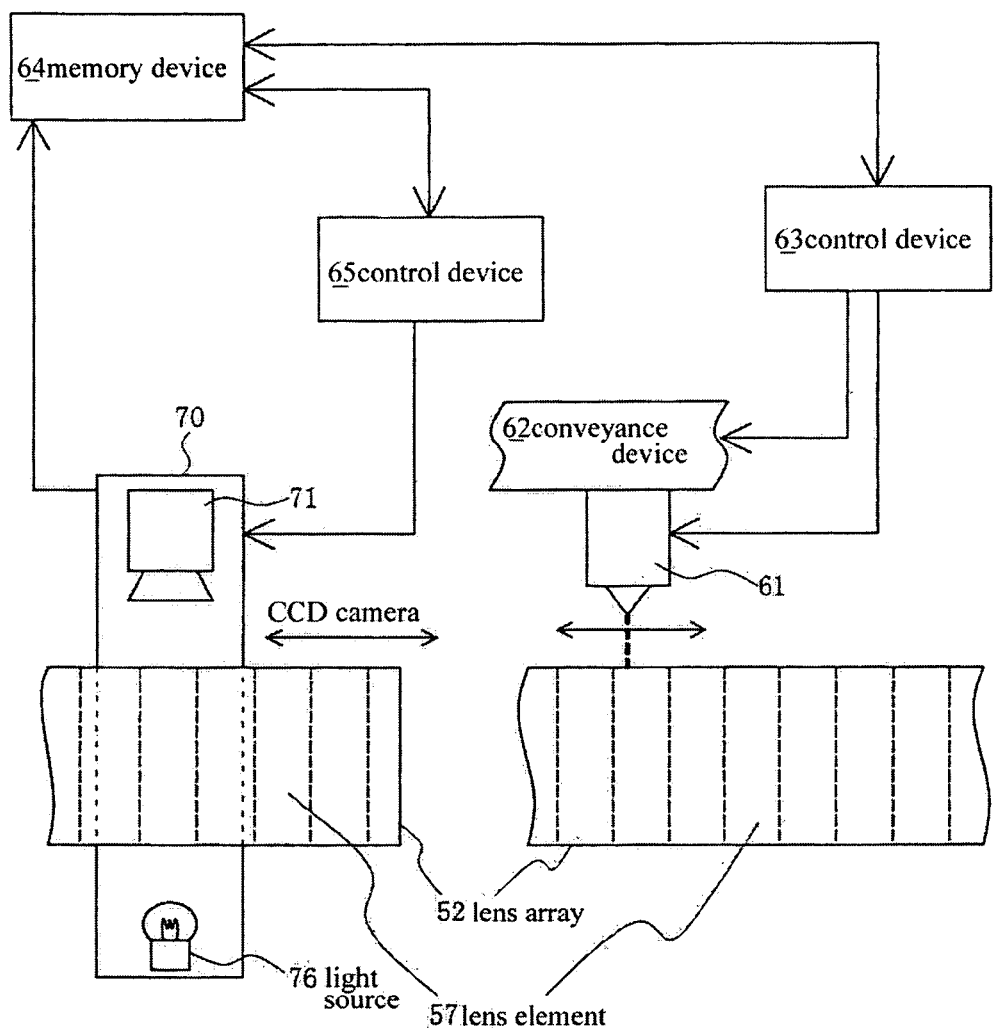
FIG. 1 is a view showing a structure of a shielding-pattern forming device according to the first embodiment of this invention.
Figure 2:
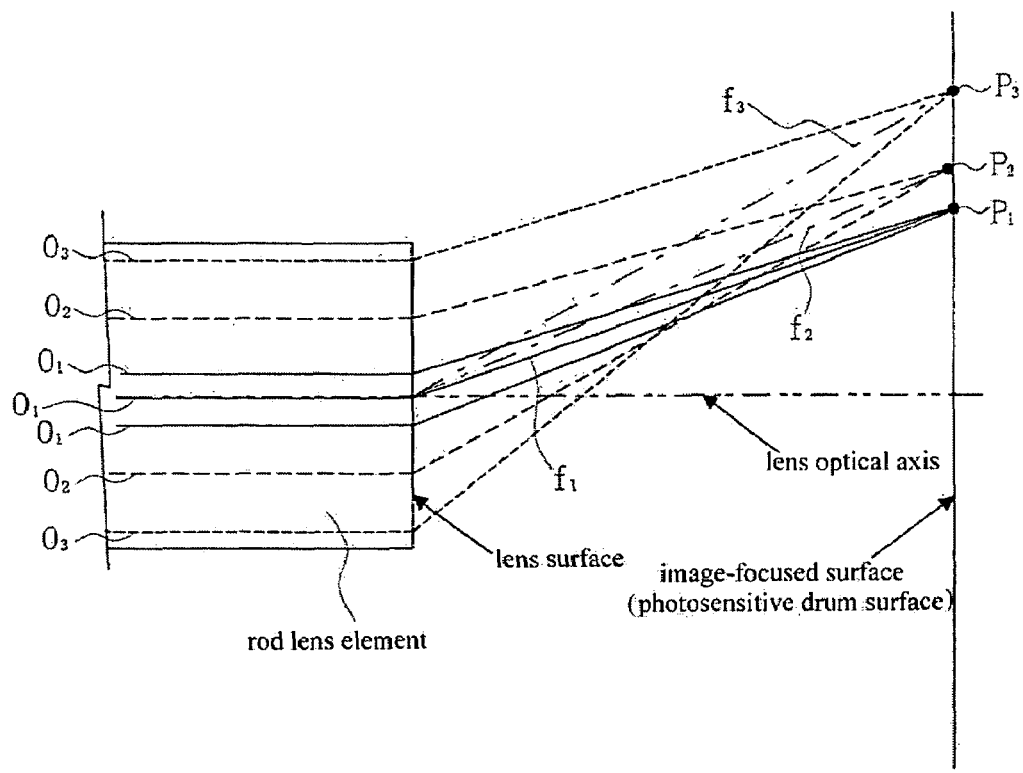
FIG. 2 is a view illustrating a defocusing due to the conventional comatic aberration.
Figure 3:
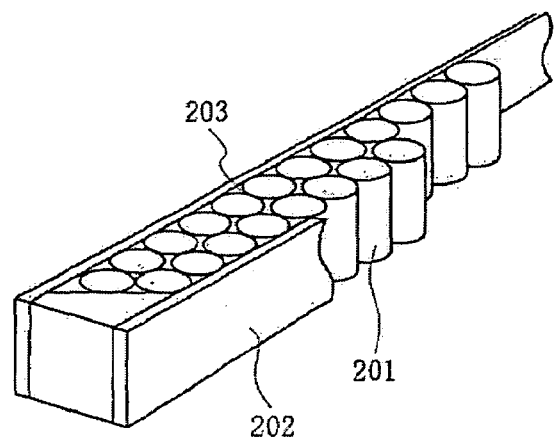
FIG. 3 is a partially cutout perspective view showing a conventional lens array.
Figure 4:
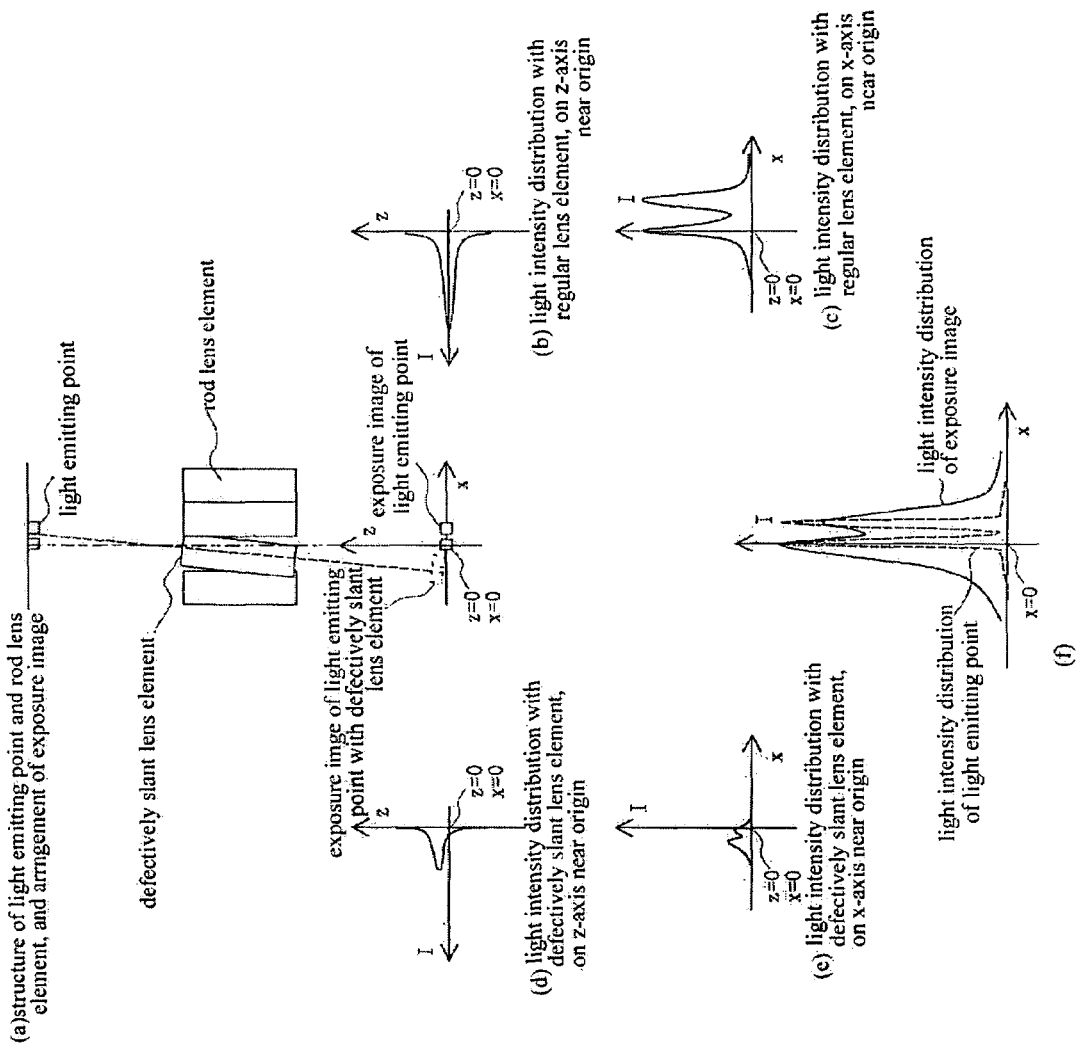
FIG. 4 is a view showing a typical relation between a light emitting point and distribution of the light intensity at the exposure image with each lens element in the conventional lens array.
Figure 9:
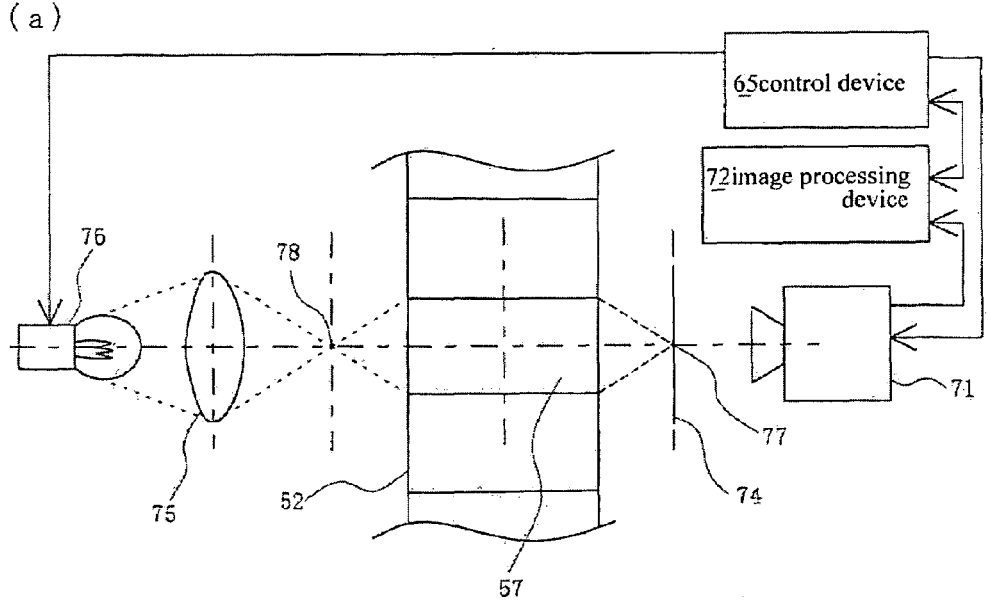
FIG. 9 is a view showing an optical axis tilt measuring device and the measurement principal according to the first embodiment of this invention.
Figure 9:
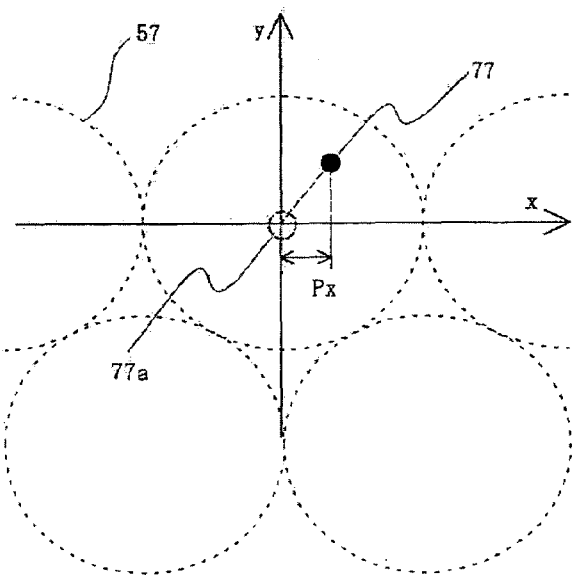
Figure 10:
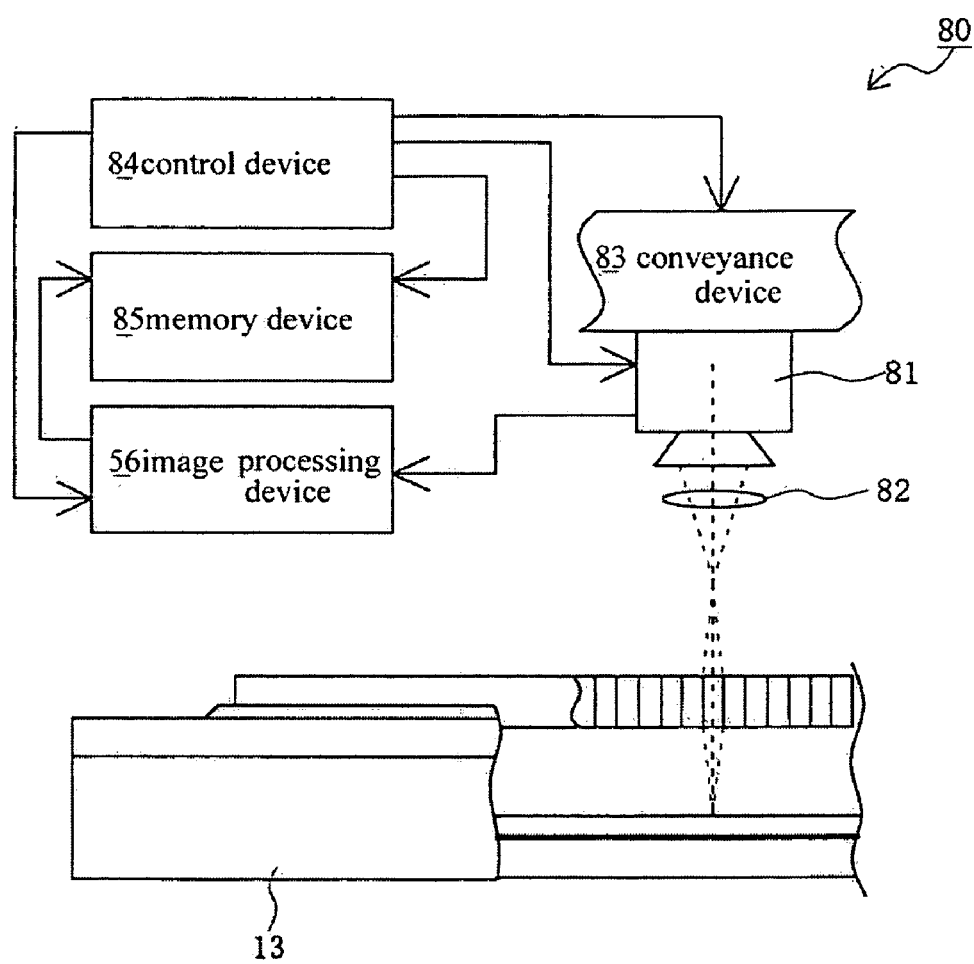
FIG. 10 is a view showing a light intensity deviation measuring device according to the first embodiment of this invention.

FIG. 1 is a view showing a structure of a shielding-pattern forming device according to the first embodiment of this invention, FIG. 9 is a view showing an optical axis tilt measuring device and the measurement principal according to the first embodiment of this invention, and FIG. 10 is a view showing a light intensity deviation measuring device according to the first embodiment of this invention.

Herein, as shown in FIG. 1, the shielding-pattern forming device comprises an optical axis tilt measuring device 70 for measuring a center position as well as the tilt of the optical axis of the lens element 57 in the lens array 52 used for the LED print head 13 serving as the exposure device, an ink jet printing device 61 for forming the shielding pattern of the shielding member 51, a conveyance device 62 for conveying the ink jet printing device 61, a control device 63 for controlling the ink jet printing device 61 and the conveyance device 62, a conveyance device, not shown, for conveying the optical axis tilt measuring device 70, a control device 65 for controlling the optical axis tilt measuring device 70, and a memory device 64. The shielding-pattern forming device securely immobilizes the lens array 52 and measures the tilt of each lens element upon rendering the optical axis tilt measuring device 70 scan the lens array 52 to print the shielding member 51 on the peripheral portion of each lens element 57 upon rendering the ink jet printing device 61 scan the lens array 52 according to the measured tilt data.

The shielding-pattern forming device first measures the center position of the lens element 57 in the lens array 52 in using a CCD (Charge Coupled Device) camera 71 of the optical axis tilt measuring device 70. As shown in FIG. 9 (*a*), the optical axis tilt measuring device 70 picks up the image in using the CCD camera 71 while moved with the conveyance device, not shown, in a direction of the array of the lens elements 57. In this case, an image processing device 72 is to record, according to the obtained image, coordinates on a two dimensional plane such as shown in FIG. 9 (*b*), at the lens array 52, facing the CCD camera 71. That is, the image processing device 72 determines a center position 77 (*a*) of each lens element 57 based on the image obtained with the CCD camera 71, such as shown in FIG. 9 (*b*), to set a predetermined position on the two dimensional plane to the origin (0, 0) and to set the center position 77*a* of each lens element 57 to xi yi coordinates, thereby storing and recording these set data in the memory device 64.

Next, the shielding-pattern forming device measures the tilt of the optical axis of the lens element 57 in using the optical axis tilt measuring device 70. Herein, the optical axis tilt measuring device 70 has a light source 76, a light condensing element 75, and the CCD camera 71. The light condensing element 75 is an optical element structured upon combination of the optical lens or the like, for condensing the light from the light source 76 onto a light emitting point 78. Furthermore, the optical axis tilt measuring device 70 is conveyed with the conveyance device, not shown, according to the positional data of the lens element 57 in the lens array 52, recorded in the memory device 64. Herein, where the lens element 57 to be measured is assumed to be arranged ideally without tilted optical axis, the positions of the light source, the light condensing element 75, and the CCD camera 71 are respectively determined so that light emitting point 78 and an image-focused point 77 defined as a position on an image-focused surface, at which the exposure image derived from the light emitting point 78 through the lens element 57 is located, are positioned on the optical axis of the lens element 57.

Where the lens elements are arranged in a double row likewise the lens array 52 in this embodiment, the optical axis tilt measuring device 70 is reciprocated. The optical axis tilt measuring device 70 measures each lens element 57 contained in each array while reciprocated in a manner to track a substantially center line of each array of the lens elements on each of a forward path and a backward path. Alternatively, the optical axis tilt measuring device 70 may measure each lens element 57 while positionally slid in a zigzag manner simply.

Herein, where the light source 76 of the optical axis tilt measuring device 70 emits light, the image-focused point 77 is exposed on the image-focused surface 74 with the lens element 57. Since the position of the image-focused point 77 on the image-focused surface 74 is different depending on the tilt of the optical axis of the lens element 57, the tilt of the optical axis of the lens element 57 can be measured upon processing the image picked up by the CCD camera 71 picks up, in using the image processing device 72. The positional shift amount can be measured upon comparison between the center position of each lens element 57, previously measured and recorded in the memory device 64, and the image-focused point 77.

To all of the lens elements 57 in the lens array 52, the optical axis tilt measuring device 70 measures positional shift Px at the image-focused point 77, in a direction of a x axis (a direction of the array of the lens elements 57 in the lens array 52) with respect to the center position 77*a* of the lens element 57, as shown in FIG. 9 (*b*), thereby storing and recording the measured positional shift Px in the memory device 64. Herein, the positional shift Px indicates a scale of displacement of the image-focused position, defined as an image focusing property of the lens element 57.

In that case, the positional shift Px can be measured according to a difference between a x-coordinate value of the center position 77*a* of each lens element 57 and a x coordinate value of the image-focused point. It is to be noted that the reason why only the positional shift in the x axis direction is measured is that deterioration in the MTF in the x axis direction defined as the direction of the array of the lens elements 57 mainly leads to deterioration in the image quality to cause irregularity in density in the x axis direction.

Next, the shielding pattern is formed to the lens array 52 in using the ink jet printing device 61 such as shown in FIG. 1. In this case, a position to be formed with the shielding pattern is determined according to both the positional data of the center position 77*a* and the tilt data of the lens element 57 in the lens array 52, recorded in the memory device 64, and further the diameter of the opening diameter or the shape of the shielding pattern is determined based on the tilt data. The control device 63 controls the conveyance device 62 to convey the ink jet printing device 61 to scan the lens array 52, while controlling the ink jet printing device 61 to form the shielding pattern.

It is to be noted that a method for forming the shielding pattern is not limited to a printing method with use of the ink jet printing device but may be a printing method with use of a printing device such as, i.e., pen recorder, a thermoelectric type, an electrophotographic type, or an impact dot printer.

In this case, after the lens array 52 formed with the shielding member 51 is fabricated together with the LED array 53 to compose the LED print head 13 such as shown in FIG. 7, serving as the exposure device, the exposure amount of each light emitting point inside the LED array 53 is corrected. In this bout, deviation in the light intensity at the exposure image with each LED element in the LED array 53 is measured with a method hereafter described, and each LED element in the LED array 53 is operated based on the data of the measured deviation to control a light emitting period so that the exposure amount is corrected. It is to be noted that the exposure amount is a product of the light intensity amount and the period. That is, the exposure amount is equal to the light intensity amount multiplied by the period.

Next, a light intensity deviation measuring device 80 such as shown in FIG. 10, measures deviation in the light intensity at the exposure images with the LED elements of the exposure device. The light intensity deviation measuring device 80 has a CCD camera 81, a light condensing element 82 through which the CCD camera 81 picks up the exposure image from the light emitting point of the exposure device, a conveyance device 83 for conveying the CCD camera 81 and the light condensing element 82 in a direction of an array of the light emitting points of the exposure device to make a scanning process, an image processing device 86 for measuring deviation in the light intensity of each light emitting point upon processing the image picked up by the CCD camera 81, a memory device 85 for recording measured results, a control device 84 for controlling those, and a control device, not shown, for operating the LED print head 13 serving as the exposure device defined as a measuring object.

In that case, the LED print head 13, the CCD camera 81, and the light condensing element 82 are arranged so the CCD camera 81 as to be focused on the exposure image from the light emitting point of the LED print head 13. Furthermore, the conveyance device 83 is arranged so the CCD camera 81 and the light condensing element 82 as to scan each light emitting point of the LED print head 13.

To measure deviation in the light intensity of the exposure images with the LED elements, each light emitting point of the LED print head 13 is first rendered to emit the light. Subsequently, the conveyance device 83 renders the CCD camera 81 and the light condensing element 82 make a scanning process in a direction of the array of the light emitting points while the CCD camera 81 picks up the image of the exposure image from each light emitting point. The image processing device 86 processes the image of the exposure image from each light emitting point, picked up by the CCD camera 81, together with scanning position data of the CCD camera 81, and subsequently the light intensity of each light emitting point of the LED print head 13 is measured. It is to be noted that t together with a serial number for identifying the individual LED print head 13.

Furthermore, the memory 42 in a housing of the image forming apparatus 10 mounted with the LED print head 13 stores control data of each light emitting point of the LED print head 13, for correcting deviation in the individual light intensity at the LED print heads 13 as well as at the light emitting points of the LED print head 13. Furthermore, on the condition that the control data of each light emitting point together with the serial number for identifying the individual LED print head 13 are stored in a server, not shown, connected to a net work, the housing of the image forming apparatus 10 is connected, when fabricated, to the net work, and the control data of each emitting point, i.e., the data for determining the exposure period corresponding to each light emitting point, is called from the server based on the serial number for identifying the mounted LED print head 13, thereby being picked up as stored in the memory 42 of the housing of the image forming apparatus 10. Therefore, the image forming apparatus 10 can control a light emitting period of each light emitting point in accordance with the control data of each light emitting point corresponding to the mounted LED print head 13, so that the light emitting points can make an exposure process respectively with the light emitting of the approximately uniform amount.

The method for correcting the light intensity is not limited to the above described method, but the light intensity at the exposure image with each LED element may be uniformed upon adjusting the current amount for operating each LED element.

It is to be noted that the method to store the control data of each light emitting point of the LED print head 13, for correcting deviation in the individual light intensity at the LED print heads 13 as well as at the light emitting points of the LED print head 13, in the memory 42 in the housing of the image forming apparatus 10 mounted with the LED print head 13, is not limited to such as described above.

Upon arranging a memory device in the LED print head 13, the control data of each light emitting point of the LED print head 13, for correcting deviation in the individual light intensity at the LED print heads 13 as well as at the light emitting points of the LED print head 13, can be stored in the memory device.

Operation of the above structured LED print head 13 is described next.

First, based on the control data of the LED element, for correcting deviation in the light intensity at the exposure image, stored in the memory 42 in the housing of the image forming apparatus 10, the driver IC, not shown, arranged on the board 56 shown in FIG. 7, drives the LED array 53. The LED array 53 then emits the light and the light emitted from the LED array 53 is incident on the lens array 52. In this case, of the light emitted form the LED array 53, one part of the light near the peripheral portion of the lens element 57 in the lens array 52 hits the shielding pattern of the shielding member 51 such as shown in FIG. 8, thereby being cut off. On the other hand, one part of the light transmitted through the lens element 57 in the lens array 52 is transmitted through the opening portion of the shielding member 51, so that the image from the light emitting-point emitting in the LED array 53 is focused on the photosensitive drum 11 such as shown in FIG. 7, thereby forming the exposure image on the photosensitive drum 11.

It is to be noted that, as shown in FIG. 8, with respect to the defectively slant lens element 57 in the lens array 52, having the optical axis comparatively slanted greatly in comparison, the opening diameter of the shielding pattern of the shielding member 51 is set to smaller, and the shielded portion in contact with the shielding pattern, near the peripheral portion of the defectively slant lens element 57a, is set to comparatively wide, so that the light transmitted through the opening portion is limited to that transmitted through the center portion of the defectively slant lens element 57a.

Since the opening diameter of the shielding pattern of the shielding member 51 is different depending on the tilt of the optical axis of the lens element 57, deviation occurs in the light intensity per unit time at the exposure image with the LED element. However, such as described above, the controller 41 of the image forming apparatus 10 controls entire operation of the image forming apparatus 10, and the LED head driving controller 44 drives the LED print head 13 based on the correction data stored in the memory 42, in accordance with the controller 41. The light emitting period of the light emitting point is thus controlled based on the control data of the LED element, for correction deviation in the light intensity at the exposure image, stored in the memory 42 of the image forming apparatus 10, so that the light intensity at the exposure image exposed on the photosensitive drum 11 becomes uniform.

As described above, in this embodiment, since there is no positional shift between the center position of the opening of the shielding pattern of the shielding member 51 and the center position 77a of each lens element 57 in the lens array 52, only the light from the peripheral portion of each lens element 57 can be cut off, thereby being able to obtain such an effect resulted from arrangement of the shielding member 51, as improving the MTF defined as the image focusing property with the lens element 57. Furthermore, the image in a good condition can be obtain without any occurrence of problems such as, e.g., a streak, an irregular density, or the like, in the image. Therefore, it is possible to solve such problems on the conventional exposure device, described in the section of "Description of Related Art", that, e.g., the effect resulted from the arrangement of the shielding member cannot be obtained, or that white streaks appear periodically, or that the exposure image is not formed at all on the photosensitive drum so the image formation itself as to become unimplementable Furthermore, with respect to the defectively slant lens element 57 in the lens array 52, having the optical axis tilted greatly in comparison, the shielding pattern having the smaller opening diameter is to be formed. That is, the shape or position of the shielding member 51 is set corresponding to the positional shift on the image-focused position, defined as the image focusing property with the lens element 57. It is to be noted that on the shielding pattern of the lens element 57, the opening portion transmitted the light from the lens element 57 is rendered smaller as the positional shift amount of the image-focused position with the lens element 57 is larger. Therefore, the clearer image can be formed upon deepening a depth of field on the exposure image from the defectively slant lens element 57a having greatly tilted optical axis. Accordingly, the deterioration in the MTF of the exposure image near the defectively slant lens element 57a can be suppressed so that the defective image such as having a vertical streak or the like can be prevented from occurring on the printed image.

Furthermore, since the opening diameter of the shielding pattern of the shielding member 51 is different depending on the tilt of the optical axis of the lens element 57, deviation in the light intensity per unit time occurs on the exposure image with the LED element, however, the light emitting period of the light emitting point is to be controlled based on the control data of the LED element, for correcting deviation in the light intensity at the exposure image, stored in the memory 42 in the housing of the image forming apparatus 10. Therefore, the light intensity at the exposure image exposed on the photosensitive drum 11 becomes uniform, so that the image of extremely high quality, without any irregular density or streaks, can be obtained.

The second embodiment of this invention is described next. It is to be noted that the members structured the same as the first embodiment are assigned with the same numerals to omit the duplicated explanation. Furthermore, the same operation and effects as the first embodiment are also omitted to be explained.

Figure 11:
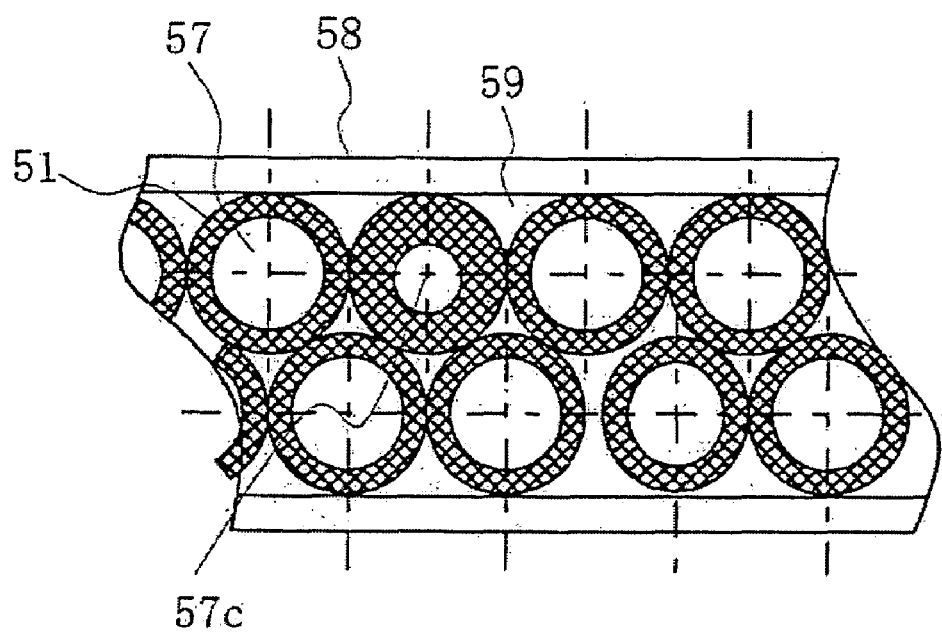
FIG. 11 is a view showing a structure of a shielding pattern of a shielding member according to the second embodiment of this invention.
Figure 11:
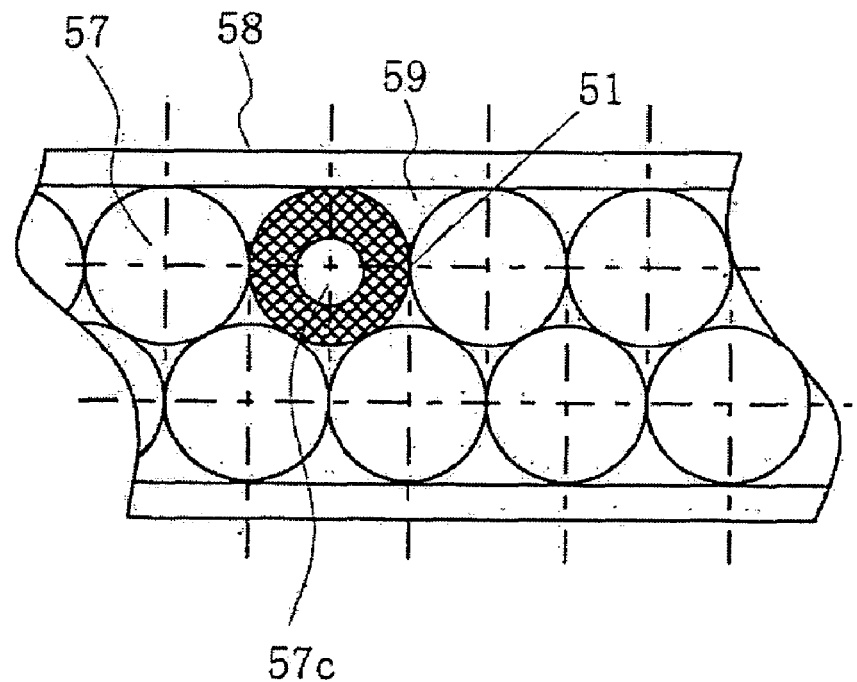

FIG. 11 is a view showing a structure of a shielding pattern of the shielding member according to the second embodiment of this invention.

In this embodiment, the shielding member 51 comprises the black coating material etc. for shielding against the light form the light source, and forms a shielding pattern. The shielding pattern of the shielding member is formed in a manner to shield one part of the peripheral portion of the lens element 57 against the light from the LED element on the LED array 53. As shown in FIG. 11 (a), with respect to the lens element 57 having the comparatively good MTF defined as the image focusing property with the lens element 57, the shielding pattern having the openings of the same diameter is formed, while the shielding pattern having the openings of the small diameter is formed with respect to the lens element 57c having the defective MTF, i.e., having the comparatively small MTF. Furthermore, with respect to a lens element 57c having the defective MTF, the opening diameter of the shielding pattern is rendered smaller as a value of the MTF is smaller.

As shown in FIG. 11 (b), the shielding pattern may be formed only to the lens element having the defective MTF, i.e., having the comparatively small MTF. Furthermore, the opening diameter of the shielding pattern may be rendered smaller as an MTF value is smaller. Where the image forming apparatus 10 with use of the LED print head 13 serving as the exposure device, has the comparatively low resolution, the sufficient effect can be exerted with the above described method for forming the shielding pattern.

As shown in FIG. 11, the lens array 52 is directly painted with use of the black coating material to structure the shielding member 51, however, the shielding member 51 is not limited to the above described structure but may be formed upon forming the shielding pattern to a transmitting member for transmitting the light from the light source or upon forming the opening by digging holes on a plate member shielding against the light from the light source with an etching process or a molding method.

Furthermore, the shielding pattern of the shielding member 51 according to this embodiment is, as shown in FIG. 11, a pattern in a circular shape, for shielding the peripheral portion of each lens element 57, however, the shielding pattern is not limited to a circular shape, and the same effect can be obtained with the shielding pattern in an elliptical shape, a rectangular shape, or the like. Furthermore, the same effect can be obtained even where the defectively slant lens element 57a is entirely shielded.

The exposure device according to this embodiment is, likewise the first embodiment, such as using the LED array 53 as the light source shown in FIG. 7, in which the plurality of lens elements are arranged in parallel rows, however the exposure device is not limited to the above structure but may be such with use of a shatter composed of liquid crystal elements in combination with an exposure source such as, e.g., a semiconductor laser, a fluorescent light, a halogen lamp, or the like, used in general as the exposure device of the image forming apparatus 10.

Furthermore, the lens element 57 in the lens array 52 according to this embodiment is, as shown in FIG. 7 and FIG. 8, in a cylindrical shape as well as defined as a rod lens having a refractive index distribution extending from a central axis in a radius direction, however, the lens element 57 is not limited to the above but may have a cross section in an elliptical shape or in a rectangular shape. Furthermore, the plurality of lens arrays 52 arranged as facing one another, in which a plurality of spherical lenses or aspherical lenses are arranged in parallel rows, can be used.

A method for manufacturing the shielding member 51 according to this embodiment is described next.

Figure 12:
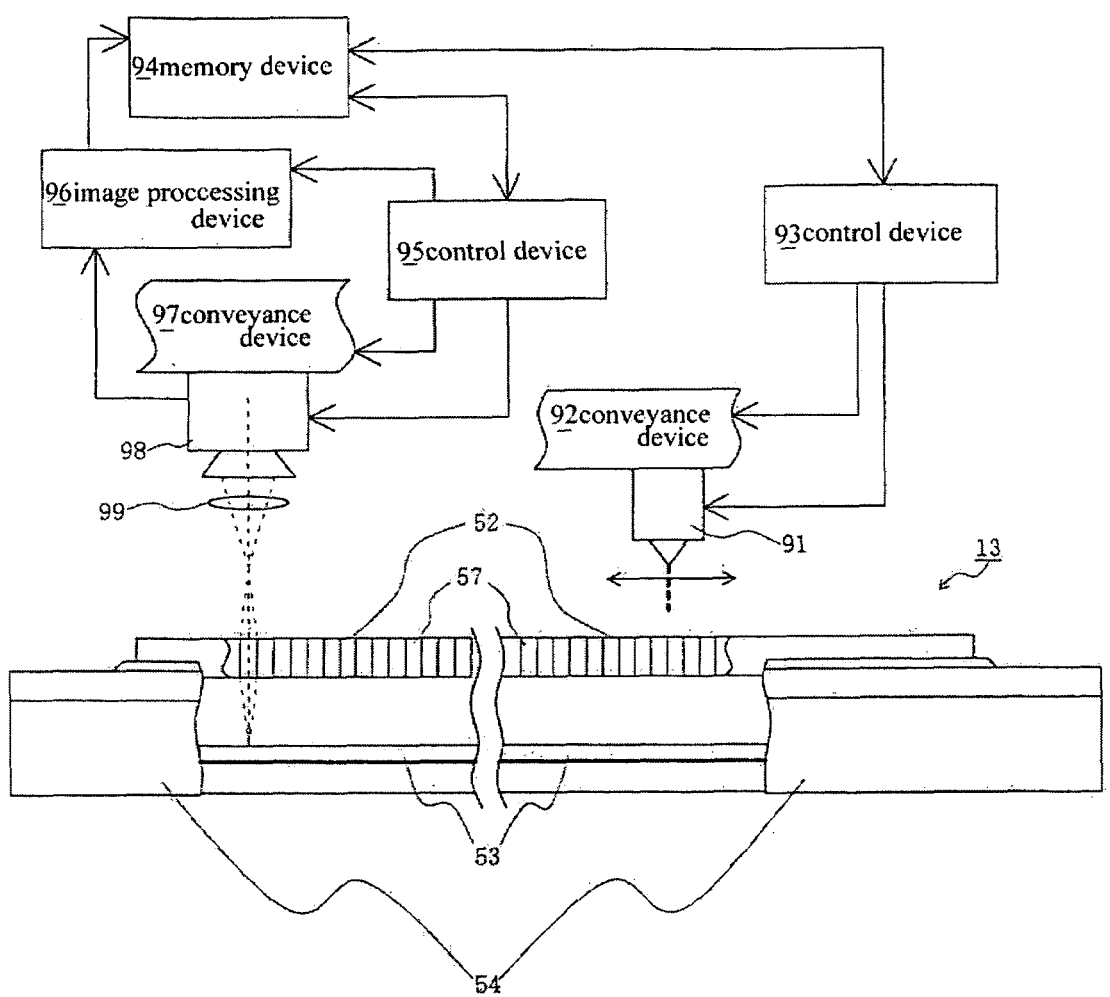
FIG. 12 is a view showing a structure of a shielding-pattern forming apparatus according to the second embodiment of this invention.

FIG. 12 is a view showing a structure of a shielding-pattern forming apparatus according to the second embodiment of this invention.

Herein, the shielding-pattern forming device comprises, as shown in FIG. 12, comprises a CCD camera 98 for measuring the center position and the MTF of the lens element 57 in the lens array 52 used for LED the print head 13 serving as the exposure device, a light condensing element 99, an image processing device 96, a conveyance device 97 for conveying the CCD camera 98, a control device 95 for controlling the CCD camera 98 as well as the conveyance device 97, an ink jet printing device 91 for forming the shielding pattern of the shielding member 51, a conveyance device 92 for conveying the ink jet printing device 91, a control device 93 for controlling the ink jet printing device 91 as well as the conveyance device 92, a conveyance device, not shown, for conveying the LED print head 13, a control device, not shown, for controlling the LED print head 13, a memory device 94, and so on.

The center of the lens element 57 and the MTF of the exposure image form each light emitting point are first measured in using the CCD camera 98. The CCD camera 98, the light emitting element 99, and the LED print head 13 as a measuring object so that the CCD camera 98 is focused on the exposure image from the light emitting point at the LED array, transmitted through the lens array 52, and so that the CCD camera 98 can scan the exposure image form the light emitting point while being shifted parallel to a direction of the array of the LED elements, with the conveyance device 97. The CCD camera 98 subsequently picks up the image while being shifted in a direction of the array of the light emitting points at the LED array 53, with the conveyance device 97. Based on the obtained image and the positional data of the CCD camera 98, the image processing device 96 calculates the center of each lens element 57 and the MTF of each light emitting point, thereby storing and recording the calculated results together with a serial number for identifying the measured LED print head 13 in the memory device 94.

Herein, the measurement of the MTF is described. The MTF indicates a contrast of the light intensity with a focus of the array of the light emitting point is observed. An MTF value of one hundred percent is set to the highest contrast as well as indicates existence of resolving power as a property of the exposure device, and the contrast of the light intensity is lower as an MTF value is smaller. In this case, in the array of the light emitting points at the LED array 53, an interval between the light emitting points next to each other is set to shorter than the diameter of the lens element 57. A light intensity distribution occurs on the image-focused surface on which the light from the light emitting point, transmitted through the lens element 57, is focused. On the light intensity distribution, the light intensity becomes the highest on the image-focused point corresponding to each light emitting point while becoming the lowest between the image-focused points next to each other. Herein, with respect to the light intensity on the image-focused surface, where the maximum value is set to $I_{max}$ while the minimum value is set to $I_{min}$, with a focus of a light emitting element, the MTF is determined by a following expression.

$$<MTF> = (I_{max} - I_{min})/(I_{max} + I_{min}) \times 100 [\%]$$

The shielding pattern is next formed to the lens array 52 with use of the ink jet printing device 91 such as shown in FIG. 12. In this case, the position to be formed with the shielding pattern, an opening diameter or shape of the shielding pattern, or the like, is determined based on the positional data of the lens element 57 in the lens array 52 and an MTF value of each light emitting point stored in the memory device 94, and the control device 93 controls the conveyance device 92 to convey the ink jet printing device 91, thereby controlling the ink jet printing device 91 to form the shielding pattern.

It is to be noted that the method for forming the shielding pattern is not limited to a printing method with use of the ink jet printing device but may be a printing method with use of a printing device such as, i.e., pen recorder, a thermoelectric type, an electrophotographic type, or an impact dot printer.

The light intensity of each light emitting point in the LED array 53 is next corrected. It is to be noted that deviation in the light intensity at the exposure image with each LED element is measured in the way as the first embodiment. Furthermore, the CCD camera 98, the light condensing element 99, the image processing device 96, or the like, such as shown in FIG. 12, can be used for measurement of deviation in the light intensity. The light intensity is corrected upon controlling, based on the measured data, the light emitting period during which the each LED element in the LED array is operated.

Likewise the first embodiment, the control data of each light emitting point of the LED print head 13, for correcting deviation in the individual light intensity at the LED print heads 13 as well as at the light emitting points of the LED print head 13, is stored in the memory 42 in the image forming apparatus 10 mounted with the LED print head 13.

The method for correcting the light intensity is not limited to the above described method, but the light intensity at the exposure image with each LED element may be uniformed upon adjusting the amount of current for operating each LED element.

It is to be noted that the method to store the control data of each light emitting point of the LED print head 13, for correcting deviation in the individual light intensity at the LED print heads 13 as well as at the light emitting points of the LED print head 13, in the memory 42 in the housing of the image forming apparatus 10 mounted with the LED print head 13, is not limited to such as described above.

Upon arranging a memory device in the LED print head 13, the control data of each light emitting point of the LED print head 13, for correcting deviation in the individual light intensity at the LED print heads 13 as well as at the light emitting points of the LED print head 13, can be stored in the memory device.

Operation of the LED print head 13 according to this embodiment is described next.

As shown in FIG. 11 (*a*), with respect to the defective lens element 57 inferior in the MTF, such as having a comparatively small MTF, in the lens array 52, the opening diameter of the shielding pattern of the shielding member 51 is set to smaller, and the shielded portion in contact with the shielding pattern, near the peripheral portion of the defective lens element 57*a* inferior in the MTF, is set to comparatively wide, so that the light transmitted through the opening portion is limited to that transmitted through the center portion of the defective lens element 57*a* inferior in the MTF.

Since the opening diameter of the shielding pattern of the shielding member 51 is different depending on the tilt of the optical axis of the lens element 57, deviation occurs in the light intensity per unit time at the exposure image with the LED element, however, the light emitting period of the light emitting point is controlled based on the control data of the LED element, for correction deviation in the light intensity at the exposure image, stored in the memory 42 of the image forming apparatus 10, so that the light intensity at the exposure image exposed on the photosensitive drum 11 becomes uniform.

As described above, in this embodiment, the positional shift between the center position of the opening of the shielding pattern of the shielding member 51 and the center of each lens element 57 in the lens array 52 can be eliminated, thereby being able to shield against only the light transmitted through the peripheral portion of each lens element 57 accurately. Therefore, the effect resulted form arrangement of the shielding member 51 can be sufficiently obtained. Furthermore, the image in a good condition can be obtained without any occurrence of problems such as, e.g., the streak, the irregular density, or the like, on the image.

Problems other than the defectively slant lens element 57, such as, e.g., deviation in a material property or shapes of the lens elements 57, or the like, which cannot be solved according to the first embodiment, can be solved.

Furthermore, with the conventional exposure device described in the section of "Description of Related Art", the exposure image with the defective lens element inferior in the MTF becomes unclear, thereby causing the defective image such as having the vertical streak or the like, on the printed image, however, in this embodiment, the shielding pattern having the smaller opening diameter is formed to the defective lens element 57c inferior in the MTF, i.e., deteriorated in the MTF, so that a depth of field at the exposure image is deepen, thereby being able to form the clearer exposure image. That is, the shape or position of the shielding member 51 is set corresponding to the MTF defined as an image focusing property with the lens element 57. It is to be noted that on the shielding pattern of the shielding member 57, the opening portion transmitted the light from the lens element 51, is set to smaller as an MTF value of the lens element 57 is smaller. Therefore, the defective image such as having the vertical streak, or the like, can be prevented from occurring on the printed image even near the lens element deteriorated in the MTF.

Furthermore, since the opening diameter of the shielding pattern is different depending on an MTF value of the lens element 57, deviation occurs in the light intensity per unit time at the exposure image with the LED element, but the light emitting period of the light emitting point is controlled based on the control data of the LED element, for correcting deviation in the light intensity at the exposure image, stored in the memory 42 in the image forming apparatus 10, so that the light intensity at the exposure image exposed on the photosensitive drum 11 becomes uniform, and as a result, the image of extremely high quality without any irregular density or streaks can be obtained on the printed image.

The third embodiment of this invention is described next. It is to be noted that the same as the first embodiment and the second embodiment are assigned with the same numerals to omit the duplicated explanation. Furthermore, the same operation and effects as the first embodiment and the second embodiment are also omitted to be explained.

Figure 13:
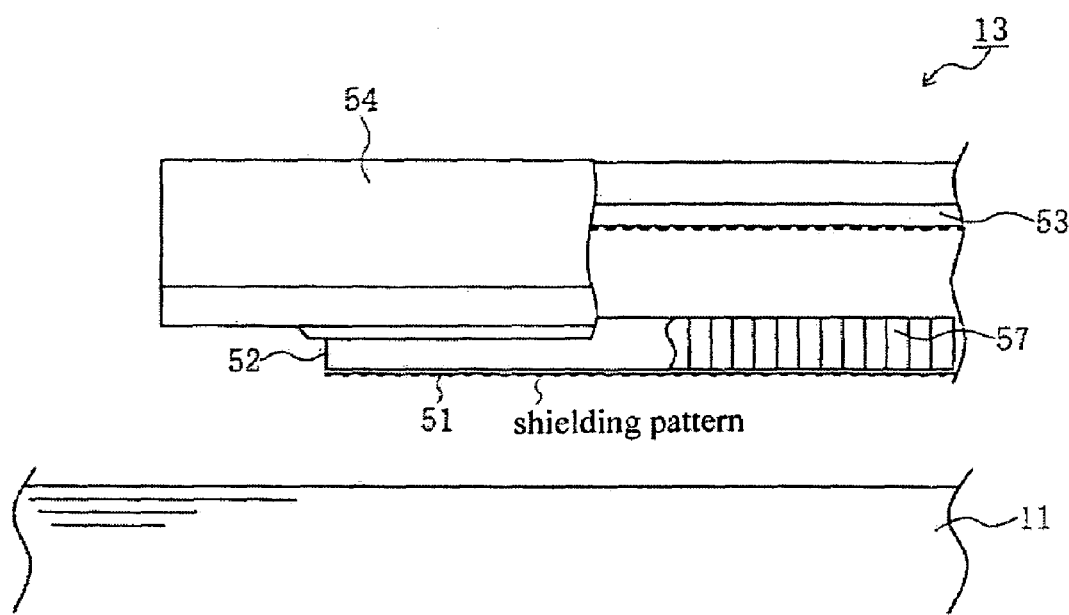
FIG. 13 is a view showing a structure of an LED print head used for an image forming apparatus according to the third embodiment of this invention.

FIG. 13 is a view showing a structure of the LED print head used for the image forming apparatus according to the third embodiment of this invention.

Herein, the shielding member 51 is formed upon forming the shielding pattern with use of the black coating material or the like for shielding against the light from the light source, onto a member made of a glass, a resin, or the like, transmitted the light from the light source. The shielding pattern of the shielding member 51 is formed in a manner to shield the peripheral portion of the lens element 57 against the light from the LED element on the LED array 53. The opening is formed to a position of the shielding pattern, corresponding to the center (the optical axis) of the lens element 57.

Furthermore, on the shielding pattern, the small opening diameter is formed with respect to the defective lens element 57c inferior in the MTF, such as having the comparatively small MTF, and the shielding pattern is formed in a manner to have the smaller opening diameter as an MTF value is smaller.

In this embodiment, the shielding pattern is to be formed to the transmitting member transmitted the light from the light source, but the opening may be formed to a plate member transmitted the light from the light source upon an etching process, a punching process, or a molding method.

The shielding pattern of the shielding member 51 according to this embodiment is a pattern in a circular shape shielding the peripheral portion of each lens element 57, but not limited to in a circular shape, and the same effect can be obtained with the shielding pattern in an elliptical or a rectangular shape. Furthermore, the same effect can be obtained with a pattern such as covering and shielding entirely one or the plurality of lens elements against the light from the light source.

Furthermore, as shown in FIG. 13, in the exposure device according to this embodiment, the LED array 53 is used as the light source, in which the plurality of LED elements are arranged in parallel rows, however, the exposure device is not limited to the above structure, but may be such with use of a shatter composed of liquid crystal elements in combination with an exposure source such as, e.g., a semiconductor laser, a fluorescent light, a halogen lamp, or the like, used in general as the exposure device of the image forming apparatus 10.

Furthermore, the lens element 57 in the lens array 52 according to this embodiment is, as shown in FIG. 7 and FIG. 8, in a cylindrical shape as well as defined as a rod lens having a refractive index distribution extending from a central axis in a radius direction, however, the lens element 57 is not limited to the above but may have a cross section in an elliptical shape or in a rectangular shape. Furthermore, the plurality of lens arrays 52 arranged as facing one another, in which a plurality of spherical lenses or aspherical lenses are arranged in parallel rows, can be used.

A method for manufacturing the shielding member 51 according to this embodiment is described next.

Figure 14:
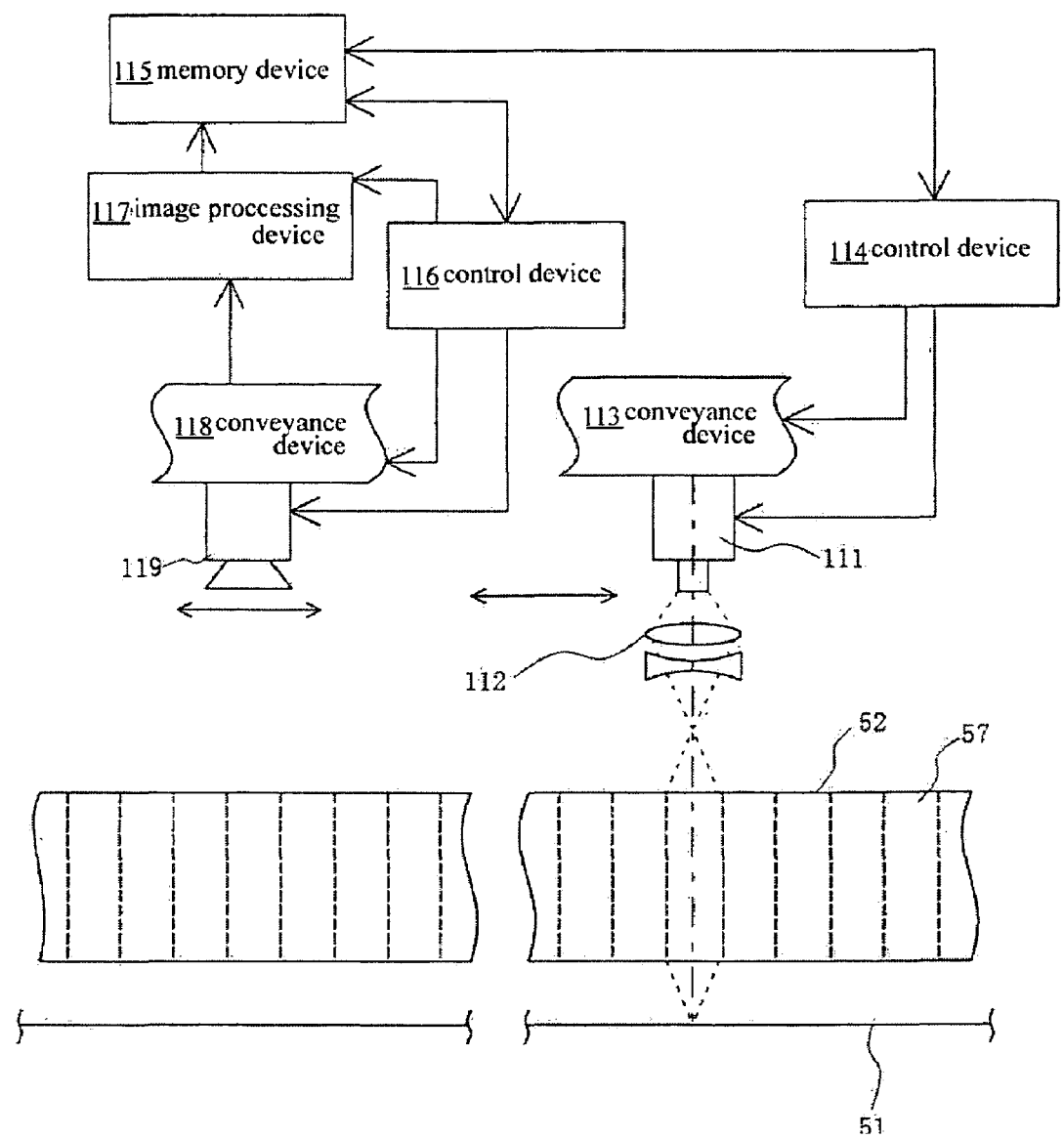
FIG. 14 is a view showing a structure of a device for manufacturing a shielding member used for an exposure device according to the third embodiment of this invention.

FIG. 14 is a view showing a structure of a device for manufacturing the shielding member used for the exposure device according to the third embodiment.

Herein, the device for manufacturing the shielding member 51 comprises a CCD camera 119 for measuring a center position and a position of the lens element 57 in the lens array 52 used for the LED print head 13 serving as the exposure device, a conveyance device 118 for conveying the CCD camera 119, a control device 116 for controlling the CCD camera 119 and the conveyance device 118, an image processing device 117, a light source 111 for forming a shielding pattern of the shielding member 51, a light condensing element 112, a conveyance device, not shown, for conveying the shielding member 51 and the lens array 52, a conveyance device 113 for conveying the light source 111, a control device 114 for controlling the light source 111 and the conveyance device 113, a memory device 115, or the like. It is to be noted that the shielding member 51 and the lens array 52 used for forming the pattern of the shielding member 51 are set as a pair, and fabricated as united into the LED print head 13 in a subsequent process.

The CCD camera 119 is first used to measure the position of each lens element 57. The CCD camera 119, the lens element 57, the lens array 52, or the like, are arranged so that the CCD camera 119 can scan the lens array 52 while being shifted parallel to a direction of the array of the LED elements, with the conveyance device 118. The CCD camera 119 subsequently picks up the image while being shifted in a direction of the array of the lens elements 57, with the conveyance device 118. Based on the obtained image and the positional data of the CCD camera 119, the image processing device 117 calculates the position of each lens element 57, thereby storing and recording the calculated value together with a serial number for identifying the measured lens array 52 in the memory device 115.

A method for forming the shielding pattern on the shielding member 51 is described next.

As shown in FIG. 14, a distance between a position at which the light condensing lens 112 condenses the light from the light source 111 and the opening surface of the lens array 52 is equal to the focal distance of the lens array 52, while the shielding member 51 is in parallel with the lens array 52, and a distance between the shielding member 51 and the opening surface of the lens array 52 is equal to the focal distance of the lens array 52. The light source 111 and the light condensing elements 112 are conveyed with the conveyance device 113, parallel to a direction of the array of the lens elements 57, thereby scanning the lens array 52. The light source 111 emits the light when conveyed up onto the center position of the lens element 57, and the light from the light source 111 is condensed with the light condensing lens 112 to be focused on the shielding member 51 with the lens array 52, thereby forming the exposure image. In this bout, the control device 114 controls the conveyance device 113 to convey the light source 111 and the light condensing lens 112 as well as to control a timing for emitting the light of the light source 111, based on the positional data of the lens element 57 in the individual lens array 52 identified with a serial number stored in the memory device 115.

A method for forming the shielding pattern of the shielding member 51 is the same as the processing method such as with the etching process, widely known in general. That is, a photosensitive material is previously applied onto the shielding member 51. On the other hand, a solvent is to dissolve the exposed photosensitive material but the unexposed photosensitive. After exposing the shielding member 51 with the light transmitted through the lens array 52 to expose the photosensitive material applied onto a surface layer of the shielding member 51, the exposed photosensitive member is dissolved with the solvent to develop a negative image of the exposure image transmitted through the lens array, on the shielding member 51.

It is to be noted that a method for forming the shielding pattern is not limited to the above method but may be any methods as long as developing the exposure image transmitted through the lens array 52 or the negative image of the exposure image on the shielding member 51.

Furthermore, the shielding member 51 formed with the shielding pattern and the lens array 52 are incorporated into the LED print head 13 serving as the exposure device. It is to be noted that a structure of the LED print head 13 is such as shown in FIG. 13. A direction to incorporate the shielding member 51 and the lens array 52 into the LED print head 13 is the same as a direction to form the shielding pattern of the shielding member 51, and as shown in FIG. 13, the lens array 52 and the shielding member 51 are arranged in contiguity with each other. In this bout, a position on the opening of the lens array 52, to which the shielding member 51 is arranged, may be at a side of the LED array 53.

The light intensity of each light emitting point in the LED array 53 is corrected next. It is to be noted that deviation in the light intensity of the exposure image with the LED element is measured in the same manner as the first embodiment, so that the duplicated explanation is omitted.

Furthermore, likewise the first embodiment, Furthermore, the memory 42 in a housing of the image forming apparatus 10 mounted with the LED print head 13 stores control data of each light emitting point of the LED print head 13, for correcting deviation in the individual light intensity at the LED print heads 13 as well as at the light emitting points of the LED print head 13.

The method for correcting the light intensity is not limited to the above described method, but the light intensity at the exposure image with each LED element may be uniformed upon adjusting the amount of current for operating each LED element.

It is to be noted that the method to store the control data of each light emitting point of the LED print head 13, for correcting deviation in the individual light intensity at the LED print heads 13 as well as at the light emitting points of the LED print head 13, in the memory 42 in the housing of the image forming apparatus 10 mounted with the LED print head 13, is not limited to such as described above.

Upon arranging a memory device in the LED print head 13, the control data of each light emitting point of the LED print head 13, for correcting deviation in the individual light intensity at the LED print heads 13 as well as at the light emitting points of the LED print head 13, can be stored in the memory device.

Operation of the LED print head 13 according to this embodiment is described next.

Likewise a case as shown in FIG. 11 (a) according to the second embodiment, with respect to the defective lens element 57 inferior in the MTF, such as having a comparatively small MTF, in the lens array 52, the opening diameter of the shielding pattern of the shielding member 51 is set to smaller, and the shielded portion in contact with the shielding pattern, near the peripheral portion of the defective lens element 57a inferior in the MTF, is set to comparatively wide, so that the light transmitted through the opening portion is limited to that transmitted through the center portion of the defective lens element 57a inferior in the MTF.

Since the opening diameter of the shielding pattern of the shielding member 51 is different depending on the tilt of the optical axis of the lens element 57, deviation occurs in the light intensity per unit time at the exposure image with the LED element, however, the light emitting period of the light emitting point is controlled based on the control data of the LED element, for correction deviation in the light intensity at the exposure image, stored in the memory 42 of the image forming apparatus 10, so that the light intensity at the exposure image exposed on the photosensitive drum 11 becomes uniform.

As described above, in this embodiment, the positional shift between the center of the opening of the shielding pattern of the shielding member 51 and the center of each lens element 57 in the lens array 52 can be eliminated, thereby being able to shield against only the light transmitted through the peripheral portion of each lens element 57 accurately. Therefore, the effect resulted form arrangement of the shielding member 51 can be sufficiently obtained. Furthermore, the image in a good condition can be obtained without any occurrence of problems such as, e.g., the streak, the irregular density, or the like, on the image.

Furthermore, the problems resulted from deviation in a material property or shapes of the lens elements 57, can be resolved.

Furthermore, with the conventional exposure device described in the section of Description of Related Art", the exposure image with the defective lens element inferior in the MTF becomes unclear, thereby causing the defective image such as having the vertical streak or the like, on the printed image, however, in this embodiment, the shielding pattern having the smaller opening diameter is formed to the defective lens element 57c inferior in the MTF, i.e., deteriorated in the MTF, so that a depth of field at the exposure image is deepen, thereby being able to form the clearer exposure image. That is, the shape or position of the shielding member 51 is set corresponding to the MTF defined as an image focusing property with the lens element 57. It is to be noted that on the shielding pattern of the shielding member 57, the opening portion transmitted the light from the lens element 51, is set to smaller as an MTF value of the lens element 57 is smaller. Therefore, the defective image such as having the vertical streak, or the like, can be prevented from occurring on the printed image even near the lens element deteriorated in the MTF.

Furthermore, since the opening diameter of the shielding pattern is different depending on an MTF value of the lens element 57, deviation occurs in the light intensity per unit time at the exposure image with the LED element, but the light emitting period of the light emitting point is controlled based on the control data of the LED element, for correcting deviation in the light intensity at the exposure image, stored in the memory 42 in the image forming apparatus 10, so that the light intensity at the exposure image exposed on the photosensitive drum 11 becomes uniform, and as a result, the image of extremely high quality without any irregular density or streaks can be obtained on the printed image.

Furthermore, a property of the lens array 52 or the lens element 57 can be measured without requiring much time or troubles, and the problems due to deviation in the lens elements 57 can be solved.

It is to be noted that this invention is not limited to the above described embodiments, but can be variously modified based on the purpose of this invention, and these modifications are not excluded from the scope of this invention.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An exposure device for use in an electrophotographic image forming apparatus, comprising:
   a lens array having a plurality of lens elements for condensing light from a light source onto a photosensitive drum; and
   a plurality of shielding members, each corresponding to one of the lens elements and shielding at least part of a peripheral portion of the corresponding lens element with respect to said light radiated from said light source,
   wherein each shielding member has a shape or a position determined depending on an image focusing property of the corresponding lens element.

2. The exposure device of claim 1, wherein the lens elements are disposed at a predetermined distance from the light source.

3. An exposure device for use in an electrophotographic image forming apparatus, comprising:
   a lens array having a plurality of lens elements for condensing light from a light source onto a photosensitive drum; and
   a plurality of shielding members, each corresponding to one of the lens elements and shielding at least part of a peripheral portion of the corresponding lens element with respect to said light radiated from said light source,
   wherein each shielding member has a shape or a position determined depending on an image focusing property of the corresponding lens element, and
   wherein said image focusing property is a shift of an image-focused position, and each shielding member has a shielding pattern that is determined depending on said shift of said image-focused position of the corresponding lens element.

4. The exposure device according to claim 3, wherein each shielding pattern of said shielding member has an opening portion for transmitting light, said opening becoming smaller as said shift of said image-focused position of the corresponding lens element becomes greater.

5. An exposure device for use in an electrophotographic image forming apparatus, comprising:
   a lens array having a plurality of lens elements for condensing light from a light source onto a photosensitive drum; and
   a plurality of shielding members, each corresponding to one of the lens elements and shielding at least part of a peripheral portion of the corresponding lens element with respect to said light radiated from said light source,
   wherein each shielding member has a shape or a position determined depending on an image focusing property of the corresponding lens element, and
   wherein said image focusing property is a Modulation Transfer Function (MTF), and each shielding member has a shielding pattern that is determined depending on the MTF value of the corresponding lens element.

6. The exposure device according to claim 5, wherein each shielding pattern of said shielding member has an opening portion for transmitting a light, said opening becoming smaller as the MTF value of the corresponding lens element becomes smaller.

7. An exposure device for use in an electrophotographic image forming apparatus, comprising:
   a lens array having a plurality of lens elements for condensing light from a light source onto a photosensitive drum; and
   a plurality of shielding members, each corresponding to one of the lens elements and shielding at least part of a peripheral portion of the corresponding lens element with respect to said light radiated from said light source,
   wherein each shielding member has a shape or a position determined depending on an image focusing property of the corresponding lens element, and
   wherein the light source comprises a plurality of light emitting elements for forming an exposure image, and
   wherein light intensity deviation among the plurality of light emitting elements is corrected after arrangement of said shielding member.

8. An exposure device for use in an electrophotographic image forming apparatus, comprising:

a lens array having a plurality of lens elements for condensing light from a light source onto a photosensitive drum; and a plurality of shielding members, each corresponding to one of the lens elements and shielding at least part of a peripheral portion of the corresponding lens element with respect to said light radiated from said light source, wherein each shielding member is set in a shape or a position depending on a positional shift of the corresponding lens element.

9. An LED print head for use in an electrophotographic image forming apparatus, comprising:

a lens array having a plurality of lens elements for condensing light from an LED array onto a photosensitive drum; and a plurality of shielding members, each corresponding to one of the lens elements and shielding at least part of a peripheral portion of the corresponding lens element with respect to said light from said LED array, wherein each shielding member is set in a shape or a position depending on an image focusing property of the corresponding lens element.

10. The exposure device according to claim 9, wherein said image focusing property is defined as a shift of an image-focused position, and said shielding member has a shielding pattern changed depending on said shift of said image-focused position of each of said lens elements.

11. The exposure device according to claim 10, wherein said shielding pattern of said shielding member has a smaller opening portion transmitting a light from said lens element as said image-focused position is shift greater.

12. The exposure device according to claim 9, wherein said image focusing property is defined as an MTF, and said shielding member has a shielding pattern changed depending on an MTF value of each lens element.

13. The exposure device according to claim 12, wherein said shielding pattern of said shielding member has a smaller opening portion transmitting a light from said lens element as said lens element has a smaller MTF value.

14. The exposure device according to claim 9, wherein the LED array comprises a plurality of LEDs, and wherein light intensity deviation among the plurality of LEDs is corrected by said shielding member.

15. An LED print head for use in an electrophotographic image forming apparatus, comprising:

a lens array having a plurality of lens elements for condensing light from an LED array onto a photosensitive drum; and a plurality of shielding members, each corresponding to one of the lens elements and shielding at least part of a peripheral portion of the corresponding lens element with respect to said light from said LED array, wherein each shielding member is set in a shape or a position depending on a positional shift of each the corresponding lens element.

16. An image forming apparatus comprising:

a photosensitive drum; and an exposure device having a lens array having a plurality of lens elements for condensing light from a light source onto said photosensitive drum, said exposure device having a plurality of shielding members, each corresponding to one of the lens elements and shielding at least part of a peripheral portion of the corresponding lens element with respect to said light radiated from said light source, wherein each shielding member is set in a shape or a position depending on an image focusing property or a positional shift of the corresponding lens element.

17. The image forming apparatus according to claim 16, wherein said exposure device is an LED print head having an LED array.

18. The exposure device according to claim 16, wherein said image focusing property is defined as a shift of an image-focused position, and said shielding member has a shielding pattern changed depending on said shift of said image-focused position of each of said lens elements.

19. The exposure device according to claim 18, wherein said shielding pattern of said shielding member has a smaller opening portion transmitting a light from said lens element as said image-focused position is shift greater.

20. The exposure device according to claim 16, wherein said image focusing property is defined as an MTF, and said shielding member has a shielding pattern changed depending on an MTF value of each lens element.

21. The exposure device according to claim 20, wherein said shielding pattern of said shielding member has a smaller opening portion transmitting a light from said lens element as said lens element has a smaller MTF value.

22. The exposure device according to claim 16, wherein the light source comprises a plurality of light emitting elements for forming an exposure image, and wherein light intensity deviation among the plurality of light emitting elements is corrected after arrangement of said shielding member.

* * * * *